US011939811B2

(12) United States Patent
Johnson et al.

(10) Patent No.: US 11,939,811 B2
(45) Date of Patent: Mar. 26, 2024

(54) SILL CORNER BRACKETS FOR COASTAL IMPACT RESISTANT FENESTRATIONS

(71) Applicant: Andersen Corporation, Bayport, MN (US)

(72) Inventors: Craig Michael Johnson, North Oaks, MN (US); Jared Asa Shanholtzer, Saint Paul Park, MN (US); Christopher Michael Hanson, Fridley, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 17/941,698

(22) Filed: Sep. 9, 2022

(65) Prior Publication Data

US 2023/0151677 A1 May 18, 2023

Related U.S. Application Data

(60) Provisional application No. 63/242,877, filed on Sep. 10, 2021.

(51) Int. Cl.

*E06B 3/44* (2006.01)
*E06B 3/22* (2006.01)
*E06B 3/96* (2006.01)
*E06B 3/964* (2006.01)

(Continued)

(52) U.S. Cl.

CPC .......... *E06B 3/9647* (2013.01); *E06B 3/9644* (2013.01); *E06B 3/9687* (2013.01); *E06B 5/10* (2013.01); *E06B 3/221* (2013.01)

(58) Field of Classification Search

CPC ..... E06B 1/36; E06B 3/42; E06B 3/44; E06B 3/4415; E06B 3/221; E06B 3/222; E06B 3/9632; E06B 3/964; E06B 3/9641; E06B 3/9644; E06B 3/9647; E06B 5/10

See application file for complete search history.

(56) References Cited

U.S. PATENT DOCUMENTS 2,573,223 A 10/1951 Jordan et al.
2,791,456 A 5/1957 Roehl et al.
3,712,482 A 1/1973 Bondowski (Continued)

FOREIGN PATENT DOCUMENTS

DE 202005021045 U1 * 3/2007 ............ E06B 7/231
DE 202012104587 U1 * 1/2013 ............ E06B 3/221

(Continued)

*Primary Examiner* — Ryan D Kwiecinski

(74) *Attorney, Agent, or Firm* — Pauly, DeVries Smith & Deffner LLC

(57) ABSTRACT

Embodiments herein relate to fenestrations exhibiting coastal impact performance. In an embodiment, a fenestration unit includes a frame assembly forming a first lower corner and a second lower corner. A first sill corner bracket can fit on a top of a sill and extend from the first lower corner partway along the top of the sill and partway along one side jamb of the frame assembly. A second sill corner bracket can be configured to fit on the top of the sill and extend from the second lower corner partway along the top of the sill and partway along the other side jamb. A bottom sash can include a bottom rail defining a channel to receive at least a portion of the first corner bracket and the second corner bracket therein when the bottom sash is in the closed position. Other embodiments are also included herein.

20 Claims, 21 Drawing Sheets

(51) Int. Cl.
*E06B 3/968* (2006.01)
*E06B 5/10* (2006.01)

(56) References Cited

U.S. PATENT DOCUMENTS

| | | | | |
|---|---|---|---|---|
| 4,956,940 | A * | 9/1990 | Touton, III | E06B 3/9632 49/467 |
| 6,565,133 | B1 | 5/2003 | Timothy | |
| 7,258,757 | B2 * | 8/2007 | Huang | B32B 17/10055 156/107 |
| 7,607,262 | B2 | 10/2009 | Pettit et al. | |
| 7,614,188 | B2 | 11/2009 | Hetherington et al. | |
| 7,827,734 | B2 * | 11/2010 | Cox | E06B 5/12 49/63 |
| 8,596,017 | B2 | 12/2013 | Emanuel | |
| 8,857,129 | B2 | 10/2014 | Beranek | |
| 9,631,415 | B2 * | 4/2017 | Eisenbarth | E06B 3/10 |
| 9,657,503 | B2 | 5/2017 | Hollermann et al. | |
| 9,718,253 | B2 | 8/2017 | Farmer et al. | |
| 10,093,051 | B2 | 10/2018 | Eggert et al. | |
| 10,119,325 | B2 | 11/2018 | Barton et al. | |
| 10,174,544 | B2 | 1/2019 | Kellum | |
| 10,550,257 | B2 | 2/2020 | Peterson et al. | |
| 10,927,578 | B2 * | 2/2021 | Vander Bent, Jr. | E06B 3/9647 |
| 11,326,391 | B2 * | 5/2022 | Luvison | E06B 3/5821 |
| 11,499,362 | B2 * | 11/2022 | Hay, III | E06B 3/4415 |
| 2006/0010792 | A1 | 1/2006 | Biggers | |
| 2006/0192391 | A1 | 8/2006 | Pettit et al. | |
| 2009/0311449 | A1 * | 12/2009 | Fehlmann | B32B 27/08 428/34 |
| 2014/0326126 | A1 * | 11/2014 | Hay, III | E06B 5/10 89/36.04 |
| 2017/0240738 | A1 | 8/2017 | Ehrlichmann et al. | |
| 2020/0332593 | A1 * | 10/2020 | Ribberink | E06B 9/24 |
| 2022/0010611 | A1 * | 1/2022 | Rietz | E06B 3/6621 |
| 2023/0151654 | A1 * | 5/2023 | Johnson | E05C 9/04 52/204.5 |
| 2023/0151676 | A1 * | 5/2023 | Johnson | E06B 3/4415 52/204.5 |
| 2023/0151677 | A1 * | 5/2023 | Johnson | E06B 3/4415 52/204.5 |

FOREIGN PATENT DOCUMENTS

| | | | | |
|---|---|---|---|---|
| DE | 102011055037 | A1 * | 5/2013 | E05C 9/185 |
| DE | 102020126640 | A1 * | 4/2022 | E06B 3/9632 |
| EP | 1270864 | A1 * | 1/2003 | E06B 9/52 |
| EP | 1550786 | A2 * | 7/2005 | E06B 1/526 |
| EP | 2202378 | A2 * | 6/2010 | E06B 1/70 |
| EP | 2469003 | A1 * | 6/2012 | E06B 1/70 |
| EP | 2589739 | A2 * | 5/2013 | E05C 9/185 |
| FR | 2960900 | A1 * | 12/2011 | E06B 3/9632 |
| FR | 3055650 | A1 * | 3/2018 | E06B 3/9616 |
| GB | 2086458 | A * | 5/1982 | E06B 3/4609 |
| WO | WO-0058589 | A2 * | 10/2000 | E06B 1/70 |
| WO | 2017221222 | | 12/2017 | |
| WO | WO-2018053510 | A1 * | 3/2018 | E06B 3/025 |

* cited by examiner

SILL CORNER BRACKETS FOR COASTAL IMPACT RESISTANT FENESTRATIONS

This application claims the benefit of U.S. Provisional Application No. 63/242,877, filed Sep. 10, 2021, the content of which is herein incorporated by reference in its entirety.

FIELD

Embodiments herein relate to fenestrations, such as windows and doors, exhibiting coastal impact performance.

BACKGROUND

Tropical storms and hurricanes can include very high wind speeds that can result in substantial amounts of objects being picked up by the wind and becoming dangerous wind driven projectiles. Such projectiles can cause glass breakage and other damage to buildings and components thereof such as windows and doors. To prevent such damage and the potential for injuries associated with the same, building codes and standards for certain coastal areas have been established to require that fenestrations meet certain requirements for high wind loads and impact resistance.

Modern fenestrations including windows and doors are recognized by architects and discerning homeowners as a positive source of aesthetics and style for the modern home while also providing remarkable energy efficiency. However, the engineering requirements associated with achieving new coastal building code requirements function as a design constraint often resulting in fenestrations without positive aesthetics and without high levels of other types of fenestration performance such as insulation and energy efficiency.

SUMMARY

Embodiments herein relate to fenestrations, such as windows and doors, exhibiting coastal impact performance. In a first aspect, an impact-resistant fenestration unit can be included having a frame assembly that can include a sill, a head jamb, and two opposed side jambs. The frame assembly can form a first lower corner and a second lower corner. A first sill corner bracket can be configured to fit on a top of the sill and extend from the first lower corner partway along the top of the sill and partway along one side jamb of the frame assembly. A second sill corner bracket can be configured to fit on the top of the sill and extend from the second lower corner partway along the top of the sill and partway along the other side jamb. A movable bottom sash can be configured to move within the frame between a closed position where a bottom portion of the bottom sash engages the top of the sill and an open position where the bottom portion of the bottom sash can be separated from the top of the sill. The bottom sash can include a bottom rail, wherein the bottom rail defines a channel to receive at least a portion of the first corner bracket and the second corner bracket therein when the bottom sash is in the closed position.

In a second aspect, in addition to one or more of the preceding or following aspects, or in the alternative to some aspects, a top surface of the sill can be substantially flat.

In a third aspect, in addition to one or more of the preceding or following aspects, or in the alternative to some aspects, the first and second sill corner brackets can be anchored in place using a fastener that penetrates through the frame assembly into an area outside the frame assembly.

In a fourth aspect, in addition to one or more of the preceding or following aspects, or in the alternative to some aspects, the sill, a head jamb, and two opposed side jambs can be formed from a lineal extrusion can include a thermoplastic resin.

In a fifth aspect, in addition to one or more of the preceding or following aspects, or in the alternative to some aspects, the movable bottom sash can include a glass subassembly and a retention member, the glass subassembly can include an interior laminate pane and an exterior pane, the retention member can engage at least a portion of the interior laminate pane.

In a sixth aspect, in addition to one or more of the preceding or following aspects, or in the alternative to some aspects, the sill includes a first support block and a second support block, wherein the first support block and the second support block can be configured to fit within the channel when the bottom sash can be in the closed position.

In a seventh aspect, in addition to one or more of the preceding or following aspects, or in the alternative to some aspects, the first sill corner bracket includes a horizontal support arm and a vertical support arm, and the second sill corner bracket includes a horizontal support arm and a vertical support arm.

In an eighth aspect, in addition to one or more of the preceding or following aspects, or in the alternative to some aspects, the first sill corner bracket horizontal support arm can be substantially perpendicular to the first sill corner bracket vertical support arm, and the second sill corner bracket horizontal support arm can be substantially perpendicular to the second sill corner bracket vertical support arm.

In a ninth aspect, in addition to one or more of the preceding or following aspects, or in the alternative to some aspects, the first sill corner bracket horizontal support arm can be configured to fit on top of the sill and the second sill corner bracket horizontal support arm can be configured to fit on top of the sill. The first sill corner bracket horizontal support arm can extend towards the second sill corner bracket horizontal support arm and the second sill corner bracket horizontal support arm can extend towards the first sill corner bracket horizontal support arm.

In a tenth aspect, in addition to one or more of the preceding or following aspects, or in the alternative to some aspects, the first sill corner bracket vertical support arm can be configured to extend along one side jamb and the second sill corner bracket vertical support arm can be configured to extend along the other side jamb.

In an eleventh aspect, in addition to one or more of the preceding or following aspects, or in the alternative to some aspects, the first sill corner bracket vertical support arm can be inset within the one side jamb and the second sill corner bracket vertical support arm can be inset within the other side jamb.

In a twelfth aspect, in addition to one or more of the preceding or following aspects, or in the alternative to some aspects, the vertical support arms can be inset within the jambs.

In a thirteenth aspect, in addition to one or more of the preceding or following aspects, or in the alternative to some aspects, the first sill corner bracket horizontal support arm defines an aperture and the first sill corner bracket vertical support arm defines an aperture. Further, the second sill corner bracket horizontal support arm defines an aperture and the second sill corner bracket vertical support arm defines an aperture. Each of the apertures can be configured to receive a fastener.

In a fourteenth aspect, in addition to one or more of the preceding or following aspects, or in the alternative to some aspects, the aperture of the first sill corner bracket vertical support arm can be vertically offset from the aperture of the second sill corner bracket vertical support arm.

In a fifteenth aspect, in addition to one or more of the preceding or following aspects, or in the alternative to some aspects, the channel can be continuous from an end of the bottom rail to an opposite end of the bottom rail.

In a sixteenth aspect, in addition to one or more of the preceding or following aspects, or in the alternative to some aspects, the horizontal support arms of the first and second sill corner brackets each define a top surface in a first plane and a bottom surface in a second plane, wherein the first and second planes is not parallel.

In a seventeenth aspect, in addition to one or more of the preceding or following aspects, or in the alternative to some aspects, the first sill corner bracket and the second sill corner bracket can be configured to be disposed within the channel defined by the bottom rail such that the first sill corner bracket and the second sill corner brackets can be not visible when the sash is closed.

In an eighteenth aspect, in addition to one or more of the preceding or following aspects, or in the alternative to some aspects, the bottom sash further can include a check rail and two opposed stiles, the bottom rail, check rail, and two opposed stiles formed from a lineal extrusion including a thermoplastic resin.

In a nineteenth aspect, in addition to one or more of the preceding or following aspects, or in the alternative to some aspects, the portion of thermoplastic resin can include at least 50 percent by weight of the total weight of materials forming the lineal extrusion.

In a twentieth aspect, in addition to one or more of the preceding or following aspects, or in the alternative to some aspects, the portion of thermoplastic resin can include at least 90 percent by weight of the total weight of materials forming the lineal extrusion.

In a twenty-first aspect, in addition to one or more of the preceding or following aspects, or in the alternative to some aspects, the thermoplastic resin can include polyvinylchloride.

In a twenty-second aspect, in addition to one or more of the preceding or following aspects, or in the alternative to some aspects, the bottom sash further can include a check rail and two opposed stiles, wherein at least one of the bottom rail, check rail, and two opposed stiles includes a portion can include a composite including a thermoplastic resin and at least one of particles and glass fibers.

In a twenty-third aspect, in addition to one or more of the preceding or following aspects, or in the alternative to some aspects, the bottom sash further can include a check rail and two opposed stiles, wherein at least one of the bottom rail, check rail, and two opposed stiles includes a portion can include a composite including a thermoplastic resin, an impact modifier, and at least one of particles and glass fibers.

In a twenty-fourth aspect, in addition to one or more of the preceding or following aspects, or in the alternative to some aspects, the bottom sash further can include a check rail and two opposed stiles, wherein at least one of the bottom rail, check rail, and two opposed stiles includes a portion can include a thermoplastic resin without glass fibers and a portion can include a composite including a thermoplastic resin and glass fibers.

In a twenty-fifth aspect, in addition to one or more of the preceding or following aspects, or in the alternative to some aspects, the fenestration unit includes a window.

In a twenty-sixth aspect, in addition to one or more of the preceding or following aspects, or in the alternative to some aspects, the fenestration unit includes a double-hung window.

In a twenty-seventh aspect, in addition to one or more of the preceding or following aspects, or in the alternative to some aspects, the bottom sash further can include a check rail and two opposed stiles, wherein at least one of the stiles, the bottom rail, and the check rail includes an exterior side lineal extrusion and an interior side lineal extrusion.

In a twenty-eighth aspect, in addition to one or more of the preceding or following aspects, or in the alternative to some aspects, the exterior side lineal extrusion and an interior side lineal extrusion can be separated from one another with at least one of foam tape and an adhesive.

In a twenty-ninth aspect, in addition to one or more of the preceding or following aspects, or in the alternative to some aspects, the fenestration unit can further include a balancer disposed within the bottom sash.

In a thirtieth aspect, in addition to one or more of the preceding or following aspects, or in the alternative to some aspects, the bottom sash further can further include a check rail and two opposed stiles, wherein the first stile of the two opposed stiles and the bottom rail intersect appearing as a mortise and tenon joint, the first stile of the two opposed stiles and the check rail intersect appearing as a mortise and tenon joint, the second stile of the two opposed stiles and the bottom rail intersect appearing as a mortise and tenon joint, and the second stile of the two opposed stiles and the check rail intersect appearing as a mortise and tenon joint.

In a thirty-first aspect, in addition to one or more of the preceding or following aspects, or in the alternative to some aspects, the bottom sash further can include a check rail and two opposed stiles, wherein at least one of the first stile, the second stile, the bottom rail, and the check rail includes a thermal break between interior and exterior sides thereof.

In a thirty-second aspect, in addition to one or more of the preceding or following aspects, or in the alternative to some aspects, the bottom sash further can include a check rail and two opposed stiles, wherein at least one of the first stile, the second stile, the bottom rail, and the check rail includes a structure can include a first material interrupted with a second material in cross-section to create a thermal break.

In a thirty-third aspect, in addition to one or more of the preceding or following aspects, or in the alternative to some aspects, the bottom sash further can include a check rail and two opposed stiles, wherein at least one of the first stile, the second stile, the bottom rail, and the check rail includes an exterior side lineal extrusion and an interior side lineal extrusion and a thermal break between adjacent portions of the exterior lineal extrusion and the interior lineal extrusion.

In a thirty-fourth aspect, in addition to one or more of the preceding or following aspects, or in the alternative to some aspects, the impact-resistant fenestration unit exhibits impact resistance properties satisfying ASTM E1996-17 missile level A.

In a thirty-fifth aspect, in addition to one or more of the preceding or following aspects, or in the alternative to some aspects, the impact-resistant fenestration unit exhibits impact resistance properties satisfying ASTM E1996-17 missile level D.

In a thirty-sixth aspect, in addition to one or more of the preceding or following aspects, or in the alternative to some aspects, the impact-resistant fenestration unit exhibits HVHZ/Wind Zone 4 impact resistance and cyclical pressure properties.

In a thirty-seventh aspect, in addition to one or more of the preceding or following aspects, or in the alternative to some aspects, the impact-resistant fenestration unit meets TAS 201 and 203 requirements.

In a thirty-eighth aspect, in addition to one or more of the preceding or following aspects, or in the alternative to some aspects, the impact-resistant fenestration unit exhibits a U factor of less than or equal to 0.40 BTU/h*ft2*° F.

In a thirty-ninth aspect, in addition to one or more of the preceding or following aspects, or in the alternative to some aspects, the impact-resistant fenestration unit exhibits a U factor of less than or equal to 0.30 BTU/h*ft2*° F.

In a fortieth aspect, in addition to one or more of the preceding or following aspects, or in the alternative to some aspects, the bottom rail lacks a metal material interconnecting an exterior window side of the first stile with an interior window side of the first stile.

In a forty-first aspect, in addition to one or more of the preceding or following aspects, or in the alternative to some aspects, the bottom sash can include a transparent central area and the top sash can include a transparent central area, wherein the transparent areas cover a surface area of at least 55% of the overall area defined by an outer perimeter of the frame assembly.

In a forty-second aspect, in addition to one or more of the preceding or following aspects, or in the alternative to some aspects, wherein metal makes up less than 30 percent by weight of the impact-resistant fenestration unit excluding hardware and fasteners.

In a forty-third aspect, in addition to one or more of the preceding or following aspects, or in the alternative to some aspects, the bottom sash further can include a check rail, wherein the check rail includes a surface defining an exterior window side top corner and an interior window side top corner, wherein a radius of curvature of the interior corner can be greater than 0.2 inches.

In a forty-fourth aspect, in addition to one or more of the preceding or following aspects, or in the alternative to some aspects, the check rail can include a flat portion in between the exterior top corner and the interior top corner, the flat portion having a width of less than 1.5 inches.

In a forty-fifth aspect, in addition to one or more of the preceding or following aspects, or in the alternative to some aspects, the fenestration unit can be configured to maintain impact-resistant properties independent of an external profile shape of extrusions forming the bottom rail, check rail, and two opposed stiles.

In a forty-sixth aspect, an impact-resistant fenestration unit can be included having a frame assembly including a sill, a head jamb, and two opposed side jambs. The fenestration unit can further include a bottom sash, the bottom sash including a bottom rail, a check rail, and two opposed stiles. The bottom sash can be configured to move within the frame between a closed position where a bottom portion of the bottom sash engages a top of the sill and an open position where the bottom portion of the bottom sash can be separated from the top of the sill. The bottom sash can form a first lower corner, a second lower corner, a first upper corner, and a second upper corner. The first stile of the two opposed stiles and the bottom rail intersect appearing as a mortise and tenon joint, and wherein the impact-resistant fenestration unit exhibits impact resistance properties satisfying ASTM E1996-17 missile level D, and wherein the impact-resistant fenestration unit exhibits a U factor of less than or equal to 0.40 BTU/h*ft2*° F.

In a forty-seventh aspect, an impact-resistant fenestration unit can be included having a frame assembly including a sill, a head jamb, and two opposed side jambs. The fenestration unit can further include a bottom sash, the bottom sash including a bottom rail, a check rail, and two opposed stiles. The bottom sash can be configured to move within the frame between a closed position where a bottom portion of the bottom sash engages a top of the sill and an open position where the bottom portion of the bottom sash can be separated from the top of the sill. The bottom sash can form a first lower corner, a second lower corner, a first upper corner, and a second upper corner. Metal can make up less than 30 percent by weight of the impact-resistant fenestration unit excluding hardware and fasteners. The impact-resistant fenestration unit can exhibit impact resistance properties satisfying ASTM E1996-17 missile level D and exhibit a U factor of less than or equal to 0.40 BTU/h*ft2*° F.

In a forty-eighth aspect, an impact-resistant fenestration unit can be included having a frame assembly including a sill, a head jamb, and two opposed side jambs. The fenestration unit can further include a bottom sash, the bottom sash including a bottom rail, a check rail, and two opposed stiles. The bottom sash can be configured to move within the frame between a closed position where a bottom portion of the bottom sash engages a top of the sill and an open position where the bottom portion of the bottom sash can be separated from the top of the sill. The bottom sash can form a first lower corner, a second lower corner, a first upper corner, and a second upper corner. The check rail of the bottom sash can include a surface defining an exterior window side top corner and an interior window side top corner, wherein a radius of curvature of the interior corner can be greater than 0.2 inches. The impact-resistant fenestration unit can exhibit impact resistance properties satisfying ASTM E1996-17 missile level D and a U factor of less than or equal to 0.40 BTU/h*ft2*° F.

In a forty-ninth aspect, an impact-resistant fenestration unit can be included having a frame assembly including a sill, a head jamb, and two opposed side jambs. The fenestration unit can further include a bottom sash, the bottom sash including a bottom rail, a check rail, and two opposed stiles. The bottom sash can be configured to move within the frame between a closed position where a bottom portion of the bottom sash engages a top of the sill and an open position where the bottom portion of the bottom sash can be separated from the top of the sill. The bottom sash can form a first lower corner, a second lower corner, a first upper corner, and a second upper corner. The bottom sash can include a transparent central area and the top sash can include a transparent central area. The transparent areas can cover a surface area of at least 55% of the overall area defined by an outer perimeter of the frame assembly. The impact-resistant fenestration unit can exhibit impact resistance properties satisfying ASTM E1996-17 missile level D and exhibit a U factor of less than or equal to 0.40 BTU/h*ft2*° F.

In a fiftieth aspect, a sill bracket system for an impact-resistant fenestration unit can be included having a first sill corner bracket including a horizontal support arm and a vertical support arm. The first sill corner bracket can define at least two apertures therein to receive fasteners. The second sill corner bracket can include a horizontal support arm and a vertical support arm. The second sill corner bracket can also define at least two apertures therein to receive fasteners.

In a fifty-first aspect, in addition to one or more of the preceding or following aspects, or in the alternative to some aspects, a bottom surface of the horizontal support arm can be angled with respect to plane passing through the horizontal support arm and normal to a lengthwise axis of the vertical support arm.

In a fifty-second aspect, in addition to one or more of the preceding or following aspects, or in the alternative to some aspects, a bottom surface of the horizontal support arm of the first sill corner bracket can be angled with respect to a top surface of the horizontal support arm of the first sill corner bracket.

In a fifty-third aspect, in addition to one or more of the preceding or following aspects, or in the alternative to some aspects, the angle can be from 1 to 15 degrees.

In a fifty-fourth aspect, in addition to one or more of the preceding or following aspects, or in the alternative to some aspects, the angle can be configured to match a sill slope of a fenestration unit onto which the sill bracket system can be mounted.

In a fifty-fifth aspect, in addition to one or more of the preceding or following aspects, or in the alternative to some aspects, at least one of the apertures to receive fasteners can be defined by the vertical support arm of the first sill corner bracket and at least one of the apertures to receive fasteners can be defined by the vertical support arm of the second sill corner bracket, and the aperture defined by the vertical support arm of the first sill corner bracket can be vertically offset from the aperture defined by the vertical support arm of the second sill corner bracket.

In a fifty-sixth aspect, in addition to one or more of the preceding or following aspects, or in the alternative to some aspects, the vertical offset can be from 0.1 inches to 2 inches.

In a fifty-seventh aspect, in addition to one or more of the preceding or following aspects, or in the alternative to some aspects, a bottom surface of the horizontal support arm of the first sill corner bracket defines a drain channel therein interconnecting an interior side of the horizontal support arm with an exterior side of the horizontal support arm.

In a fifty-eighth aspect, in addition to one or more of the preceding or following aspects, or in the alternative to some aspects, the vertical support arm of the first sill corner bracket defines a first channel extending part way along a vertical axis of the vertical support arm of the first sill corner bracket and the vertical support arm of the first sill corner bracket defines a second channel extending part way along a vertical axis of the vertical support arm of the second sill corner bracket.

In a fifty-ninth aspect, a method of securing an impact-resistant fenestration unit to a rough opening can be included. The method can include placing the impact-resistant fenestration unit within a rough opening, placing a first sill corner bracket on top of a sill of the impact-resistant fenestration unit and adjacent to a first lower corner of a frame assembly of the impact resistant fenestration unit, inserting a fastener through the first sill corner bracket, through the frame assembly, and into the rough opening, placing a second sill corner bracket on top of the sill of the impact-resistant fenestration unit and adjacent to a second lower corner of the frame assembly of the impact resistant fenestration unit, and inserting a fastener through the second sill corner bracket, through the frame assembly, and into the rough opening.

In a sixtieth aspect, in addition to one or more of the preceding or following aspects, or in the alternative to some aspects, placing the first sill corner bracket on top of the sill of the impact-resistant fenestration unit and adjacent to the first lower corner of the frame assembly of the impact resistant fenestration unit includes insetting a vertical support arm of the first sill corner bracket within a first side jamb of the impact-resistant fenestration unit, and placing the second sill corner bracket on top of the sill of the impact-resistant fenestration unit and adjacent to the second lower corner of the frame assembly of the impact resistant fenestration unit includes insetting a vertical support arm of the second sill corner bracket within a second side jamb of the impact-resistant fenestration unit.

In a sixty-first aspect, in addition to one or more of the preceding or following aspects, or in the alternative to some aspects, placing the first sill corner bracket on top of the sill of the impact-resistant fenestration unit and adjacent to the first lower corner of the frame assembly of the impact resistant fenestration unit includes positioning a horizontal support arm of the first sill corner bracket on the sill, and placing the second sill corner bracket on top of the sill of the impact-resistant fenestration unit and adjacent to the second lower corner of the frame assembly of the impact resistant fenestration unit includes positioning a horizontal support arm of the second sill corner bracket on the sill.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
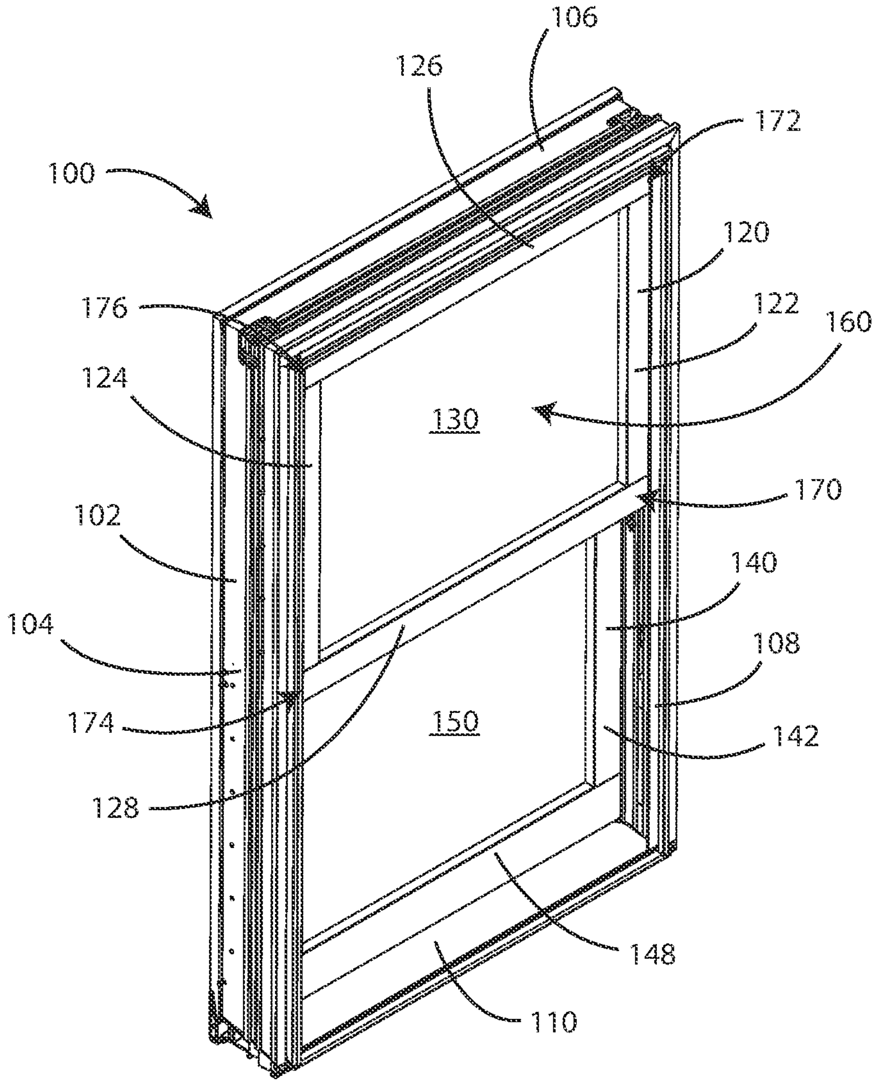
FIG. 1 is a perspective view of the exterior side of an impact-resistant fenestration unit in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Embodiments herein include fenestrations, such as windows and doors, that provide robust impact resistance while also minimizing the visibility of features required to achieve such robust impact resistance thereby promoting enhanced aesthetics. Fenestrations herein can also be formed of certain materials and physically configured to promote other measures of fenestration performance such as insulation and energy efficiency.

Certain impacts can generate substantial forces on the bottom sash, potentially leading to damage. Transferring impact loads from sash to the frame and onto the rough opening of the building can reduce the chances for damage to the sash. This is particularly true in the context of sashes wherein the corners thereof lack direct structural support by the frame. In accordance with embodiments herein, sill corner brackets can be mounted on a surface of the sill of the frame and can engage the bottom corners of the bottom sash when it is in a close position, thus providing support to the sash corners and providing for load transfer from the sash corners to the frame and onto the rough opening of the building into which the fenestration is mounted.

Various impact-resistant fenestration units herein are specifically tilt sash models, wherein a sash, such the bottom sash, can pivot about the bottom rail such that the top rail tilts or moves toward the interior side (such as in toward the interior of a building). While tilt sash models offer advantages such as making it easier for individuals to clean the exterior side of the sash(es), they can also make it more difficult to achieve desirable levels of impact resistance. However, embodiments herein can include tilt sash fenestration units that still meet impact resistance requirements.

Various impact-resistant fenestration units herein are formed using hollow lineal extrusions for rails, stiles, jambs, sills, etc. instead of solid materials such as solid wood components. While hollow lineal extrusions offer advantages in terms of efficient material usage, energy efficiency, and the like, such hollow components diminish the ability to anchor fasteners as well as transfer force. However, embodiments herein can include fenestration units formed from hollow lineal extrusions that still meet impact resistance requirements.

In an embodiment, an impact-resistant fenestration unit is included with an frame assembly and a bottom sash. The frame assembly can include a sill, a head jamb, and two opposed side jambs. The frame assembly can form a first lower corner and a second lower corner. The fenestration unit can further include a first sill corner bracket disposed in the first lower corner and a second sill corner bracket disposed in the second lower corner. The sill corner brackets can be configured to fit on top of the sill and extend from the respective corners partway along the top of the sill. The movable bottom sash can include a bottom rail, a check rail, and two opposed stiles. The movable bottom sash can be configured to move within the frame between a closed position where a bottom portion of the bottom sash engages the top of the sill and an open position where the bottom portion of the bottom sash is separated from the top of the sill. The bottom rail of the bottom sash can define a channel to receive at least a portion of the first corner bracket and the second corner bracket when the bottom sash is in the closed position. When the bottom sash in in the closed position, the sill corner brackets can be disposed within the channel. As a result, the sill corner brackets can be hidden or not visible when the bottom sash is in the closed position.

Referring now to FIG. 1, a perspective view of the exterior side 160 of an impact-resistant fenestration unit 100 is shown in accordance with various embodiments herein. The impact-resistant fenestration unit 100 includes a frame assembly 102. The frame assembly 102 includes a first side jamb 104, a head jamb 106, a second side jamb 108, and a sill 110. In various embodiments the first side jamb 104, head jamb 106, second side jamb 108, and sill 110 can be lineal extrusions formed of materials described in greater detail below. In the example, of FIG. 1, the impact-resistant fenestration unit 100 is a window and, specifically, a double-hung window. However, it will be appreciated that various features described herein can also be incorporated within other types of windows as well as doors, such as patio doors. For example, features herein can also be applied to designs for single-hung, casement, awning, sliding, and picture windows amongst others.

The impact-resistant fenestration unit 100 shown in FIG. 1 includes a top sash 120. The top sash 120 includes a first stile 122, a second stile 124, a top rail 126, and a check rail 128. The top sash 120 forms a first lower corner 170, a first upper corner 172, a second lower corner 174, and a second upper corner 176.

In various embodiments the first stile 122, second stile 124, top rail 126, and check rail 128 can be lineal extrusions formed of materials described in greater detail below. In the context of a double-hung window, the top sash 120 can slide up and down within the frame assembly 102. The top sash 120 includes a glass subassembly 130 therein. Details of exemplary glass subassemblies are provided in greater detail below.

The impact-resistant fenestration unit 100 also includes a bottom sash 140. The bottom sash 140 includes a first stile 142 and a second stile (not shown in this view). The bottom sash 140 also includes a bottom rail 148 and a check rail (not shown in this view). In various embodiments, the bottom rail 148 of the bottom sash 140 can be taller than the other rails, such as those of the top sash 120, and is sometimes referred to as a "tall bottom rail". The bottom sash 140 also includes a glass subassembly 150. Details of exemplary glass subassemblies are provided in greater detail below.

Figure 2:
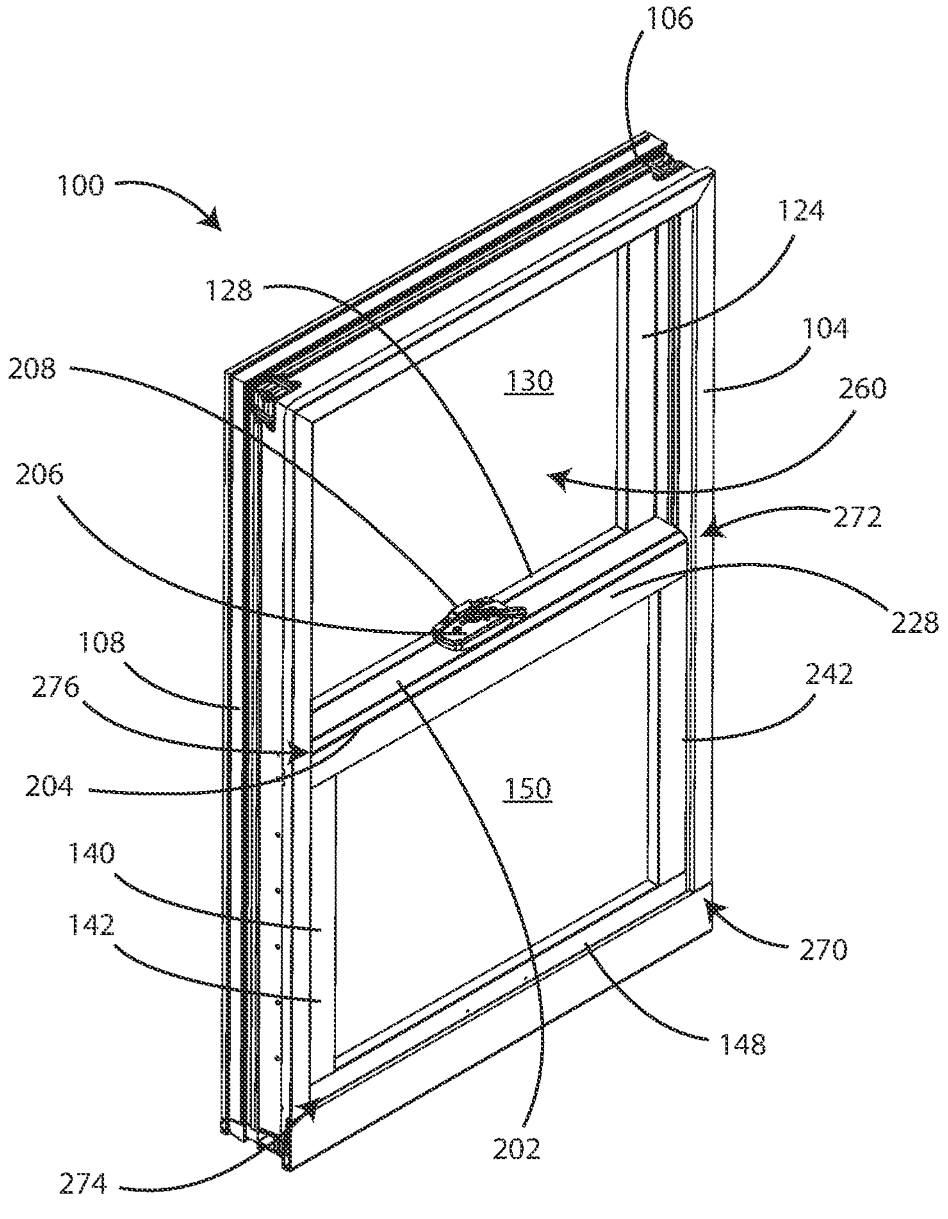
FIG. 2 is a perspective view of the interior side of an impact-resistant fenestration unit in accordance with various embodiments herein.

Referring now to FIG. 2, a perspective view of the interior side 260 of an impact-resistant fenestration unit 100 is shown in accordance with various embodiments herein. As before, the frame assembly 102 includes a first side jamb 104, a head jamb 106, a second side jamb 108, and a sill (not shown in this view). The top sash 120 includes a first stile (not shown in this view), a second stile 124, a top rail (not shown in this view), and a check rail 128.

As before, the impact-resistant fenestration unit 100 includes a bottom sash 140. The bottom sash 140 includes a bottom rail 148, a check rail 228, a first stile 142, and a second stile 242. The bottom sash includes first lower corner 270, first upper corner 272, second lower corner 274, and second upper corner 276. The bottom sash 140 is configured to move within the frame between a closed position where a bottom portion of the bottom sash engages the top of the sill 110 and an open position where the bottom portion of the bottom sash is separated from the top of the sill 110. Pins or other projections (not shown) can extend from the sides of the bottom sash 140 and fit within a channel (not shown) running vertically along an adjacent side of the side jambs to allow the bottom sash 140 to slide vertically, but still secure the bottom sash 140 within the frame assembly 102.

The impact-resistant fenestration unit 100 can also include various pieces of hardware. For example, the bottom sash 140 can includes a lock unit 206 (or sash lock) thereon, such as mounted on the bottom sash check rail 228. The top sash can include a lock keeper 208, such a mounted on the top sash check rail 128. The bottom sash check rail 228 can include a top surface including a flat portion 202 disposed between an interior window side top corner 204 and an exterior window side top corner (not shown in this view). The lock unit 206 can be mounted on the flat portion 202. In various embodiments, the flat portion 202 can have a width of less than 1.5, 1.25, 1.0 0.75, or 0.5 inches.

In various embodiments, the first stile 142 of the two opposed stiles and the bottom rail 148 intersect with the appearance of a mortise and tenon joint, such that the bottom rail 148 extends the full width of the bottom sash 140, but the opposed stiles do not extend the full height of the bottom sash 140. As such, the example of FIG. 2 stands in contrast to a design where the intersection of the stiles and rails is a mitered joint. The distinction here is significant not only for the difference in enhanced aesthetics provided for by the mortise and tenon joint but also because it impacts the length of lineal extrusions used to form the bottom sash and also reinforcement of the same. For example, in FIG. 2, since the rails extend all the way to the side edges of the bottom sash 140, they can more directly transfer loads to the frame assembly 102. There is a need to provide reinforcement and a means for effective load transfer between the ends of the check rail and the frame. Embodiments herein provide for such reinforcement in part by placing check rail brackets on the side jambs and/or by using two-piece check rail bolts and thereby reinforcing an interface between a check rail tilt bolt assembly and the side jamb of a frame of the fenestration.

Figure 3:
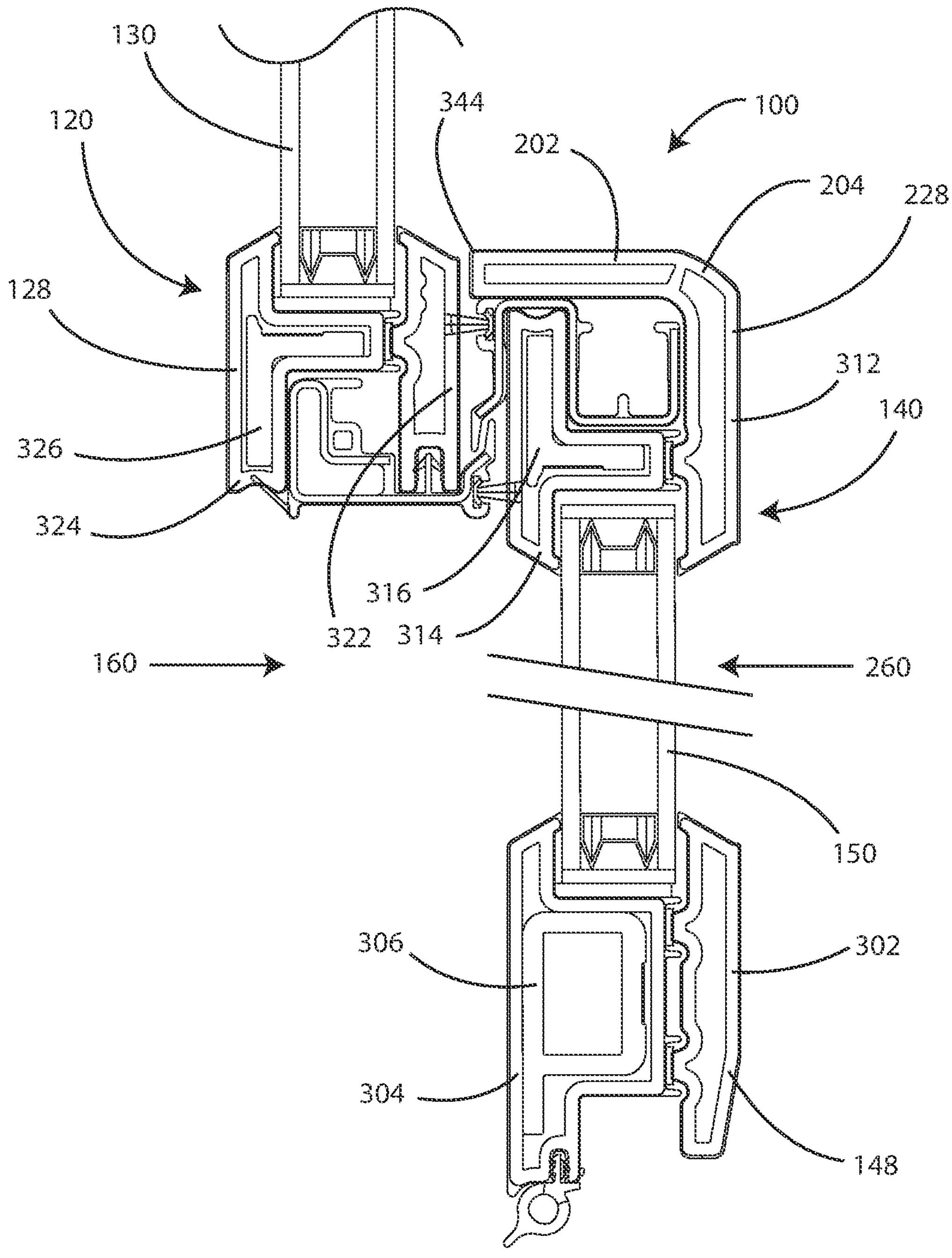
FIG. 3 is a cross-sectional view of a portion of an impact-resistant fenestration unit in accordance with various embodiments herein.

Referring now to FIG. 3, a cross-sectional view of a portion of an impact-resistant fenestration unit 100 is shown in accordance with various embodiments herein. FIG. 3 shows the interior side 260 of the impact-resistant fenestration unit 100 and the exterior side 160 thereof. The impact-resistant fenestration unit 100 includes a top sash 120 with components including a check rail 128 and a glass subassembly 130.

The check rail 128 can take on various forms and shapes. In various embodiments, the check rail 128 is formed using a lineal extrusion. In some cases, this can be a single piece lineal extrusion. However, in some cases, the check rail 128 can include two distinct lineal extrusions, three distinct lineal extrusions, or more. In the example of FIG. 3, the check rail 128 includes an interior lineal extrusion 322 and an exterior lineal extrusion 324. While not intending to be bound by theory, while thermal breaks are possible with a single extrusion, the use of at least two distinct lineal extrusions can be advantageous for thermal performance as it can readily create and/or facilitate the creation of a thermal break. While described with respect to the check rail 128, it will be appreciated that the same type of multi-part construction configuration can also be used with other components herein of the top sash, bottom sash, frame assembly, and the like.

In some embodiments, the interior lineal extrusion 322 and an exterior lineal extrusion 324 are formed of the same material, such as selected from those described in greater detail below. In other embodiments, the interior lineal extrusion 322 and an exterior lineal extrusion 324 are formed of different materials, such as each independently selected from those described in greater detail below. In some embodiments, the exterior lineal extrusion 324 is formed from a composition exhibiting greater resistance to damage (such as cracking or breaking) resulting from impacts of air borne projectiles.

The check rail 128 can also include a reinforcement member 326 therein. In some embodiments, the reinforcement member 326 can be held in place by the shape of the passage inside the lineal extrusion in which it sits. The reinforcement member 326 can be formed of various materials as described elsewhere herein.

The impact-resistant fenestration unit 100 also includes a bottom sash 140 with components including a bottom rail 148, a glass subassembly 150, and a check rail 228. As with the check rail 128 of the top sash 120, the bottom rail 148 of the bottom sash 140 in this example includes an interior side lineal extrusion 302 and an exterior side lineal extrusion 304. However, the bottom rail 148 could also be formed of a single lineal extrusion or with more than two lineal extrusions. The bottom rail 148 also includes a reinforcement member 306. In some embodiments, the reinforcement member 306 can be held in place by the shape of the passage inside the lineal extrusion in which it sits. In some embodiments, the reinforcement member 306 of the bottom rail 148 can have a different shape or configuration in cross-section. In various embodiments, the bottom rail 148 of the bottom sash 140 is taller allowing for different shapes and sizes of the reinforcement member 306 in cross-section.

In this example, the check rail 228 of the bottom sash 140 includes an interior side lineal extrusion 312 and an exterior side lineal extrusion 314. The check rail 228 of the bottom sash 140 also includes a check rail reinforcement member 316. In some embodiments, the reinforcement member 316 can be held in place by the shape of the passage inside the lineal extrusion in which it sits.

In will be appreciated that other components of the top sash and the bottom sash (such as the stiles, other rails, etc.) can also be constructed using a single-part, two-part (e.g., an interior side and exterior side lineal extrusions), or multi-part lineal extrusion designs.

In some embodiments herein where components include both interior side and exterior side lineal extrusions, reinforcement structures herein can be placed within both the interior and the exterior side lineal extrusions (e.g., multiple reinforcement structures can be used). However, in various embodiments herein where components include both interior side and exterior side lineal extrusions, reinforcement structures herein can specifically be placed within the exterior side lineal extrusions such as depicted with respect to FIG. 3. Thus, in some embodiments, reinforcement structures herein can be disposed within exterior side lineal extrusions, but not within interior side lineal extrusions.

While not intending to be bound by theory, placing reinforcement structures preferentially within exterior side lineal extrusions can offer multiple benefits. As a first example, airborne projectiles will generally originate from the exterior side of the window. Thus, providing reinforcement structures in an exterior side lineal extrusion places the reinforcement structure closer to a likely point of origination for loads associated with an impact. As a second example, providing reinforcement structures in an exterior side lineal extrusion frees up design opportunities for the interior side lineal extrusion. That is, the interior side lineal extrusion can be designed without a need to accommodate a reinforcement structure allowing for additional shapes and profiles. As such, in various embodiments herein, impact-resistant fenestration units can be configured to maintain impact-resistant properties independent of a profile shape of extrusions forming components of the top sash and/or the bottom sash, and/or components of the frame.

Interior side and exterior side lineal extrusions can be joined together in various ways. In some embodiments, such structures can be attached using mechanical fasteners. In some embodiments, such structures can be adhesively bonded together. In some embodiments, such structures can be attached using snap-fit or friction fit mechanisms. In some specific embodiments, an exterior side lineal extrusion and an interior side lineal extrusion can be attached to one another with at least one of foam tape and an adhesive.

While not intending to be bound by theory, formation of components of the top sash and the bottom sash with interior side and exterior side lineal extrusions can facilitate the formation of a thermal break therein to enhance energy efficiency. For example, formation of components with interior side and exterior side lineal extrusions can facilitate the formation of air pockets and/or a reduction in or lack of continuous material paths from the interior side of the fenestration to the exterior side of the fenestration. It will be appreciated, however, that thermal breaks can be formed in many different ways. In some embodiments, a continuous structural element passing from the exterior side to the interior side can be physically interrupted with another material in cross-section that is more resistant to conducting thermal energy (e.g., a better thermal insulator). For example, in various embodiments, a component of the frame, the bottom sash, and the top sash can include a portion interrupted with an insulating material in cross-section to create a thermal break.

Metals are generally very strong, and thus good for structural reinforcement but metals are typically also very good thermal conductors. Thus, while the use of metals can be beneficial for achieving coastal levels of structural impact requirements, their use is generally bad for thermal efficiency. As such, to improve thermal performance, in various embodiments, components of the frame, the bottom sash, and the top sash can lack a metal material interconnecting an exterior window side with an interior window side to prevent a path for substantial thermal conduction between the exterior side of fenestration and the interior side of the fenestration. In various embodiments, components of the frame, the bottom sash, and the top sash can lack a continuous metal path extending through the component (rail, stile, etc.) from a position on the interior side that is even with an interior facing surface of the glass subassembly to a position on the exterior side that is even with an exterior facing surface of the glass subassembly to prevent a path for substantial thermal conduction between the exterior side of fenestration and the interior side of the fenestration.

All things being equal, a structure that has less metal in it will be more thermally efficient than an otherwise similar structure including more metal since metals are such good thermal conductors. In various embodiments herein, metal makes up less than fixed percent by weight of the total weight of the impact-resistant fenestration unit 100, excluding the weight of metal provided by hardware and fasteners of the impact-resistant fenestration unit 100. For example, in some embodiments, the weight of metal can be less than or equal to 70 wt. %, 65 wt. %, 60 wt. %, 55 wt. %, 50 wt. %, 45 wt. %, 40 wt. %, 35 wt. %, 30 wt. %, 25 wt. %, 20 wt. %, 15 wt. %, 10 wt. %, or 5 wt. %, or can be an amount falling within a range between any of the foregoing.

In some configurations, the check rail 228 can include a top surface with a flat portion 202 disposed between an interior window side top corner 204 and an exterior window side top corner 344. The interior window side top corner 204 can include a larger (wider, less sharp) curve than the opposed exterior window side top corner 344. The larger, less sharp curve can be useful as it can prevent focusing forces associated with an impact coming from the exterior side of the window, thereby making structural failure of the check rail 228 less likely. In addition, coastal code impact testing procedures can regard opening of the lock (or sash lock) as a failure. While not intending to be bound by theory, it is believed that the larger, less sharp curve on the interior window side top corner 204 can result in less deflection of the check rail 228 making lock opening failures less likely. The larger, less sharp curve on the interior window side top corner 204 can also be useful to provide a more modern aesthetic to the look of the fenestration unit. In some embodiments, a radius of curvature of the interior corner can be greater than or equal to 0.1 inches, 0.2 inches, 0.3 inches, 0.4 inches, 0.5 inches, 0.6 inches, 0.7 inches, 0.8 inches, 0.9 inches, 1.0 inches, 1.1 inches, 1.2 inches, 1.3 inches, 1.4 inches, or 1.5 inches, or can be an amount falling within a range between any of the foregoing. The flat portion 202 of the check rail 228 can have a width can be less than or equal to 2.0 inches, 1.75 inches, 1.5 inches, 1.25 inches, 1.0 inches, 0.75 inches, or 0.50 inches, or can be an amount falling within a range between any of the foregoing.

Generally, fenestration units for coastal environments include at least one laminate pane that is designed to retain structural integrity even after substantial impacts from debris. In many cases, the laminate pane can be an interior laminate pane with an exterior pane being a non-laminate. However, in some cases, interior and exterior panes can both be laminate. In some cases, the exterior pane can be a laminate while the interior pane is not.

Laminate panes typically include a first glass layer, a second glass layer, and a polymeric material disposed between the first glass layer and the second glass layer. Embodiments herein can also include specialized components referred to as retention members that help to retain the laminate pane within the frame of the fenestration unit.

Figure 4:
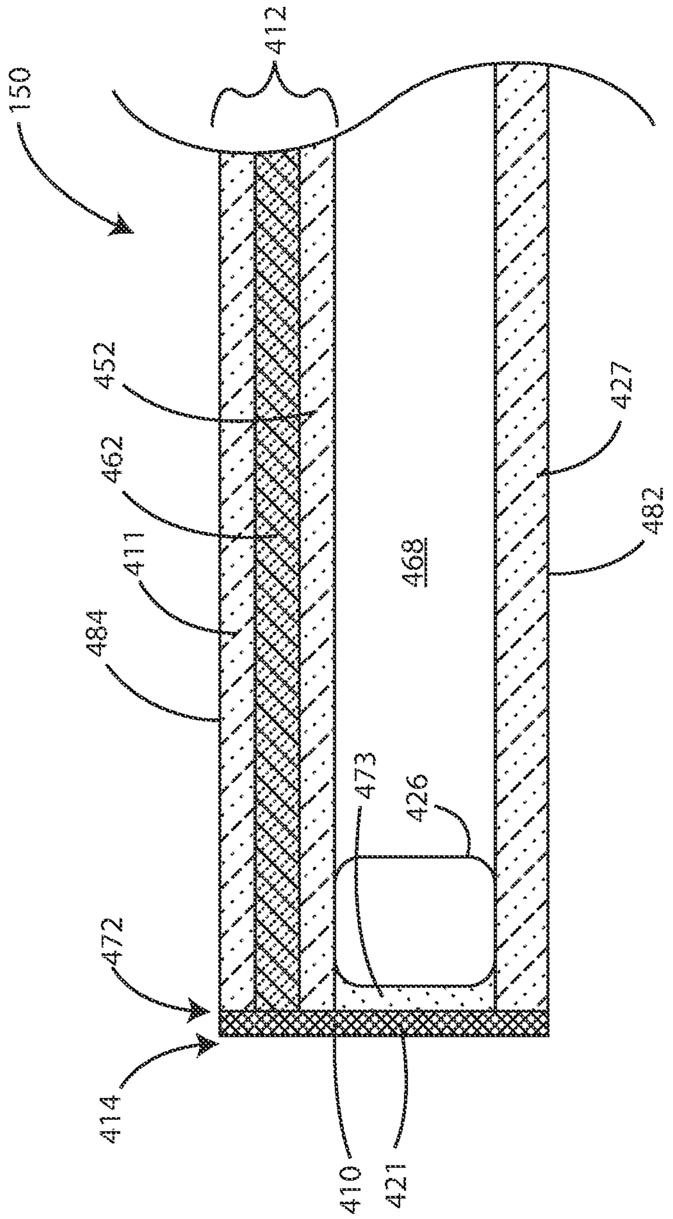
FIG. 4 is a schematic cross-sectional view of a glass subassembly in accordance with various embodiments herein.

Referring now to FIG. 4, a cross-sectional view is shown of a portion of a glass subassembly 150 in accordance with various embodiments herein. The glass subassemblies of the top sash and the bottom sash can be substantially the same. The glass subassembly 150 can include an interior laminate pane 412. The glass subassembly 150 can also include an exterior pane 427.

The glass subassembly 150 can include a proximal end 472. The glass subassembly 150 can also include an interior facing surface 484 and an exterior facing surface 482. The glass subassembly 150 also includes a sealing spacer 426. The sealing spacer 426 can serve to maintain a spacing distance between the interior laminate pane 412 and the exterior pane 427. The sealing spacer 426 can also serve to attach the interior laminate pane 412 to the exterior pane 427. The glass subassembly 150 also includes a space 468 between the interior laminate pane 412 and the exterior pane 427. The glass subassembly 150 also includes a secondary sealant 473. In various embodiments, the secondary sealant 473 can be disposed between the interior laminate pane 412 and the exterior pane 427, but on the opposite side of the sealing spacer 426 from the space 468.

The interior laminate pane 412 typically includes a first glass layer 411, a second glass layer 452, and a polymeric material 462 disposed between the first glass layer 411 and the second glass layer 452.

In various embodiments, the polymeric material 462 of the interior laminate pane 412 can include various polymers. In various embodiments, the polymeric material 462 disposed between the first glass layer 411 and the second glass layer 452 can include at least one of an ionoplast, a cast-in-place polymer, a thermoplastic, and a thermoset. In some embodiments, the polymeric material 462 can be elastomeric. In some embodiments, the polymeric material 462 can be non-elastomeric. In various embodiments, the polymeric material 462 disposed between the first glass layer 411 and the second glass layer 452 can include at least one of polyvinyl butyral (PVB), SGP (SENTRYGLAS PLUS), polyethylene terephthalate (PET), polyurethane (PUR), and ethylene-co-vinyl acetate (EVA), and hydrids/alloys/laminates/copolymers/composites thereof.

The polymeric material 462 disposed between the first glass layer 411 and the second glass layer 452 can have a thickness of various dimensions. In some embodiments, the thickness can be greater than or equal to 10, 20, 30, 45, 60, 75, or 90 mils. In some embodiments, the thickness can be less than or equal to 150, 135, 120, 105, or 90 mils. In some embodiments, the thickness can fall within a range of 30 to 150 mils, or 45 to 135 mils, or 60 to 120 mils, or 75 to 105 mils, or can be about 90 mils.

The glass layers can have thicknesses of various dimensions. In some embodiments, the thickness of the glass layers can be greater than or equal to 60, 75, 90, 120, or 150 mils. In some embodiments, the thickness can be less than or equal to 300, 200, or 150 mils. In some embodiments, the thickness can fall within a range of 60 to 300 mils, or 90 to 200 mils.

In various embodiments, the first glass layer 411 and the second glass layer 452 are the same thickness. In other embodiments, wherein the first glass layer 411 and the second glass layer 452 have different thicknesses.

In various embodiments, the polymeric material 462 may not be limited to being just between the glass layers of the interior laminate pane 412. By way of example, the polymeric material 462 can be disposed over at least a portion of a proximal end 472 of the interior laminate pane 412.

In various embodiments, the polymeric material 462 that is disposed over at least a portion of the proximal end 472 of the interior laminate pane 412 is the same as the polymeric material 462 disposed between the first glass layer 411 and the second glass layer 452. In various embodiments, the polymeric material 462 that is disposed over at least a portion of the proximal end 472 of the interior laminate pane 412 is integral with the polymeric material 462 disposed between the first glass layer 411 and the second glass layer 452. In various embodiments, the polymeric material 462 that is disposed over at least a portion of the proximal end 472 of the interior laminate pane 412 is joined to the polymeric material 462 disposed between the first glass layer 411 and the second glass layer 452 via thermal, mechanical, or chemical bonds, or other means. An interior facing surface 484 can be on the interior laminate pane 412. An exterior facing surface 482 can be on the exterior pane 427.

In various embodiments, window or door assemblies herein can include a retention member 410. In various embodiments, the retention member 410 can engage at least a portion of the interior laminate pane 412. In various embodiments, the retention member 410 having an elongation and tensile strength sufficient to provide the glass subassembly 150 with shock absorption and force dissipation protection that meets or exceeds one or more of ASTM E1886 (pressure cycling), ASTM E1996 (large and small missile impact), TAS 201 (impact), and/or TAS 203 (pressure cycling) standards.

The retention member 410 can include a base portion 421. In various embodiments, the base portion 421 can extend along and engage at least a portion of the proximal end 472 of the glass subassembly 150. In various embodiments, the base portion 421 can be of a length sufficient to project into and engage a heel bead within a channel of the upper sash or moveable lower sash to couple the retention member 410 to a frame member. In various embodiments, the base portion 421 can extend along and engage at least a portion of the proximal end 472 of the glass subassembly 150. In various embodiments, the base portion 421 can be of a width sufficient to project into and engage a bed glazing to couple the retention member 410 to a frame member.

In various embodiments, the retention member 410 includes a series of strips of a fibrous fabric or tape reinforcing material 404 applied in succession about the interior facing surface 484 and a proximal end 472 portion of the glass subassembly 150 received within the channel 414 of the frame. In various embodiments, the retention member 410 includes a body having a series of openings formed therethrough to facilitate passage of an adhesive material through the retention member. It will be appreciated that retention members used herein can include a single layer of material or can include a plurality of layers of materials.

Figure 5:
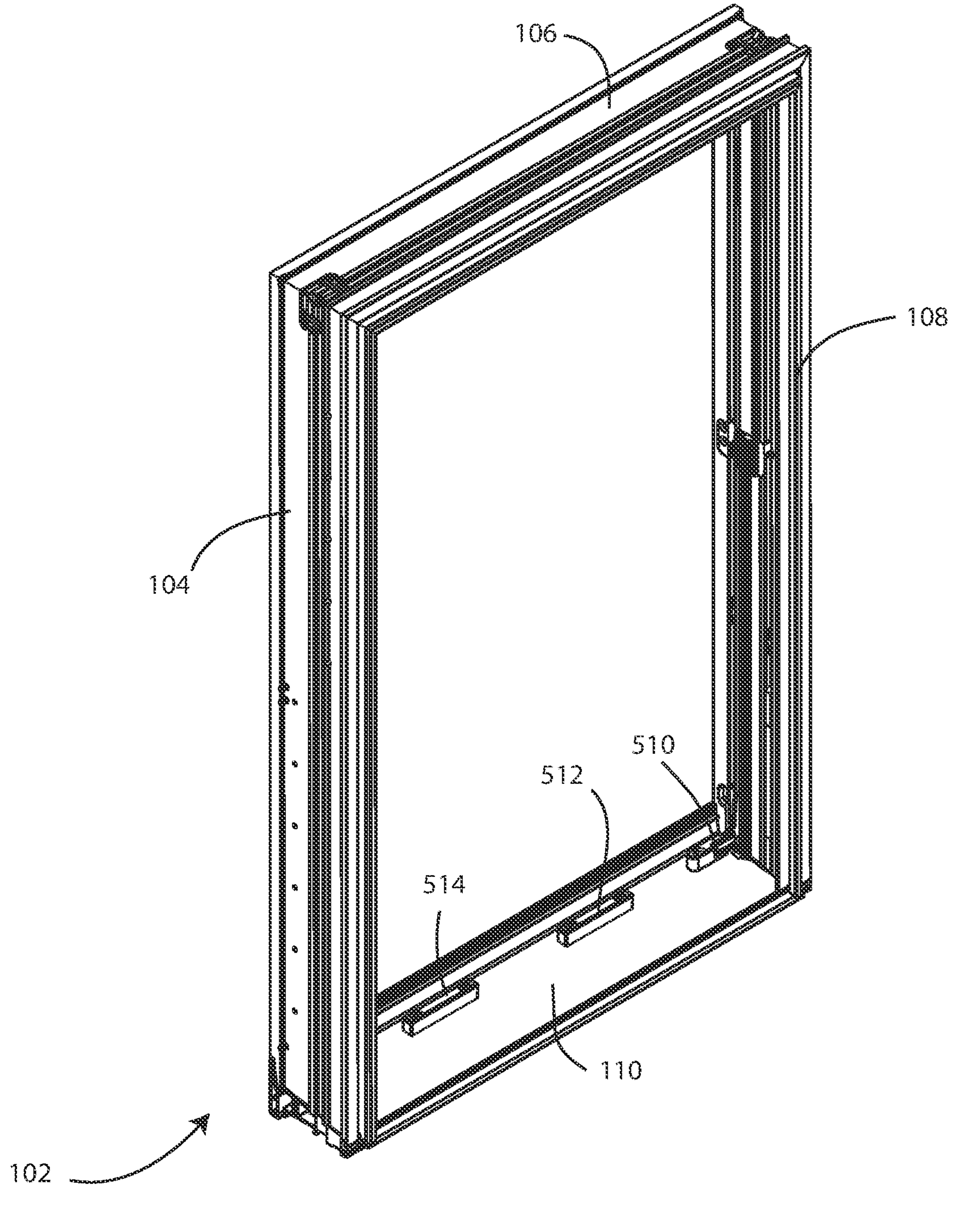
FIG. 5 is perspective view of a frame assembly in accordance with various embodiments herein.

In some applications, one or more sill corner brackets can be included in the fenestration unit 100. The sill corner brackets can provide support to the bottom sash 140 within the frame 102, and particularly to the corners of the bottom sash 140, upon an impact to the sash 140 or an adjoining area. Each of the sill corner brackets can be secured to the sill 110 and one of the side jambs 104, 108. The sill corner brackets can engage with a channel defined in the bottom of the bottom rail 148 when the bottom sash is in a closed position within the frame 102. FIG. 5 shows a perspective view of a frame assembly 102 with a first sill corner bracket

510. A second sill corner bracket (not shown in FIG. 5) can be disposed in the lower corner opposite from the first sill corner bracket 510.

Sill corner brackets herein can be formed of various materials including, but not limited to, polymers, composites, metals (pure or alloys), ceramics, and the like. In various embodiments herein, the sill corner brackets can specifically be formed of a metal.

The sill corner brackets can be configured to fit on top of the sill 110 in the corners thereof. The sill corner brackets can extend from the corner partway along the top of the sill 110. The sill corner brackets can also extend partway along the side jamb from the respective lower corner. In some embodiments, the first sill corner bracket 510 can extend vertically from one lower corner partway along the side jamb 108. The second sill corner bracket 510 can extend vertically from the second lower corner partway along the side jamb 104 in a similar manner.

The sill 110 can be substantially flat on a top surface thereof. For example, a top surface of the sill 110 can lack channels running along the length of the top surface of the sill that can interfere with water drainage, sight lines, sill cleaning, and fenestration aesthetics. In some embodiments, the majority of the area of the top surface of the sill is in a common plane (flat). In some embodiments, at least 70, 75, 80, 85, 90, 95% or more of the area of the top surface of the sill is in the same plane (flat). In some embodiments, a top surface of the sill can be entirely flat expect for sill corner brackets and any support blocks (described below) thereon. In various embodiments, the top surface of the sill 110 can be angled or sloped, such that it is not exactly perpendicular to the glass. The top surface of the sill 110 can be flat and angled to provide a drainage path. The angled flat top surface of the sill 110 can be seen in FIGS. 11-15.

In some embodiments the sill 110 can include one or support blocks 512, 514, such as two support blocks. Support blocks 512, 514 can be included when the fenestration unit is of at least a minimum width, such as 32 inches or wider. Thus, in some embodiments support blocks 512, 514 can be omitted. The support blocks 512, 514 can engage the channel in the bottom of the bottom rail 148. The support blocks 512, 514 can at least partially be disposed within the channel of the bottom check rail when the bottom sash 140 is in the closed position. The support blocks can provide additional support to maintain the bottom sash 140 within the frame 102 and transfers loads upon a horizontal impact on the sash 140.

In various embodiments, the support blocks 512, 514 can have a similar height as the portion of the sill corner brackets that extend along the sill 110, such that they extend away from the top of the sill 110 a common distance. In various embodiments, the support blocks 512, 514 can have the same width as the horizontal support arms of the sill corner brackets that extend along the sill 110. In various embodiments, the support blocks 512, 514 can include a longitudinal axis that extends along a longitudinal axis of horizontal support arms, such that the sill corner brackets and support blocks are aligned.

Figure 6:
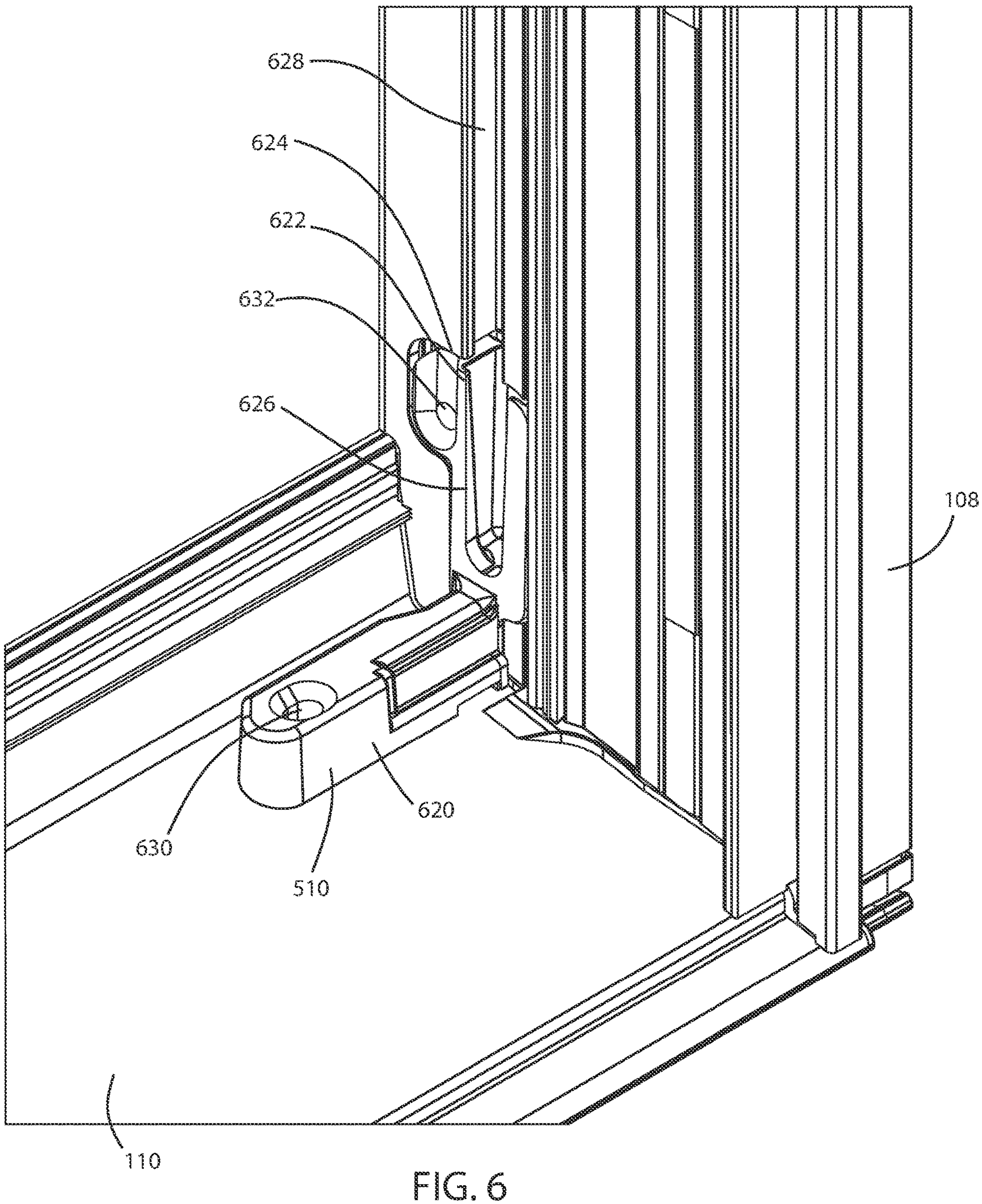
FIG. 6 is perspective view of a portion of a frame assembly in accordance with various embodiments herein.

FIG. 6 is perspective view of a portion of a frame assembly 102 with a sill corner bracket 510. The sill corner bracket 510 can include a horizontal support arm 620 and a vertical support arm 622. The horizontal support arm 620 can be configured to fit on top of the sill 110 and extend in a direction away from the corner that the bracket 510 is disposed in. The horizontal support arm 620 can extend in a direction towards the other sill corner bracket. The horizontal support arm 620 can extend in a direction toward the horizontal support arm of the other sill corner bracket.

The vertical support arm 622 can be configured to extend along one of the side jambs. In the embodiment of FIG. 6, the vertical support arm 622 extends along the side jamb 108. In various embodiments the side jamb can define a recess 624. The vertical support arm 622 can be disposed within the recess 624 to avoid interference with the side of the sash 140 as the sash 140 approaches the closed position. The vertical support arm 622 can be disposed within the recess 624 to inset or embed the vertical support arm 622 within the side jamb 108. In some embodiments, a surface of the vertical support arm 622 facing the interior of the frame can be substantially flush with a surface of the side jamb facing the interior of the frame.

In various embodiments, the vertical support arm 622 can define a channel 626 or slot. The channel 626 can be configured to accept a portion of the sash 140 or a projection extending from the sash 140 (such as a pivot pin or balancer tilt pin) when the sash 140 is in the closed position. When a pivot pin (or balancer tilt pin) is disposed in the channel 626, substantial strength is gained. In the event of forces promoting motion of the sash (such as in the exterior side to interior side direction or the reverse), the pivot pin can engage with an interior surface of the channel 626 thus providing structural support to the pivot pin and facilitating load transfer from the sash to the frame and onto the rough opening of the building into which the fenestration is mounted. In various embodiments, the bracket 510 can also include a lip around the side opening to the channel 626. In various embodiments, the channel 626 can also be tapered such that the cross-sectional area of the channel is less towards the bottom of the channel (e.g., toward the sill of the window) than at the top of the channel. In various embodiments, the side opening to the channel 626 can be tapered such that the opening is smaller in width towards the bottom of the channel (e.g., toward the sill of the window) than at the top of the channel. Further aspects of such configurations are described below with respect to FIG. 23.

In various embodiments the jamb can define a channel 628. The channel 628 can be configured to accept a portion of the sash 140 or a projection from the sash 140. In various embodiments, the channel 628 can be aligned with the channel 626, such that a portion of the sash 140 or a projection from the sash 140 can have a travel path that is at least partially defined by both channels 626, 628.

In various embodiments, the horizontal support arm 620 can define at least one aperture 630 and the vertical support arm 622 can define at least one aperture 632. The apertures 630, 632 can extend through the respective horizontal support arm 620 or vertical support arm 622 The apertures 630, 632 can be configured for a fastening element to at least partially pass through and to secure the bracket 510 to the frame 102.

While FIG. 6 only shows the first sill corner bracket 510, it should be understood that the description and disclosure of the first sill corner bracket 510 can also apply to the second sill corner bracket. The second sill corner bracket can be disposed in the opposite lower corner in a similar manner to the first sill corner bracket 510.

Figure 7:
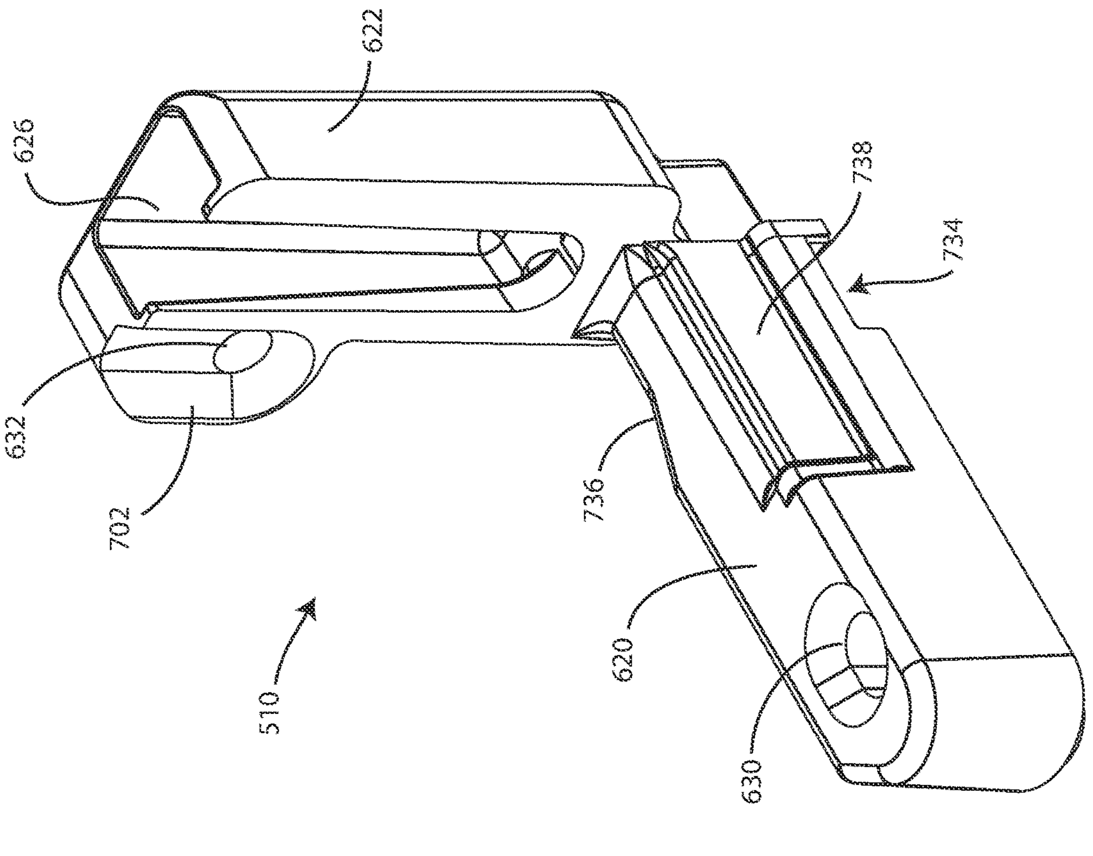
FIG. 7 is a perspective view of a sill corner bracket in accordance with various embodiments herein.

FIG. 7 is a perspective view of the first sill corner bracket 510 in accordance with various embodiments herein. The sill corner bracket 510 can include a horizontal support arm 620 and a vertical support arm 622. The horizontal support arm 620 can be perpendicular to the vertical support arm 622. Each arm 620, 622 of the bracket 510 can define an aperture 630, 632 to receive a fastening element to couple the bracket 510 to the frame 102 and/or to a rough opening in a building into which the fenestration unit is installed. The vertical support arm 622 can further include lobe 702 that is disposed off an interior side (e.g., interior with respect to the interior and exterior sides of the fenestration unit) of the vertical support arm 622, and aperture 632 can be positioned in lobe 702. Lobe 702 can be positioned to the interior side of the fenestration with respect to channel 626.

In some embodiments, a bottom portion of the sill corner bracket 510 can define a recess 734 or drain channel. When the corner bracket 510 is disposed on the sill 110, the recess 734 can allow for water drainage. In various embodiments, the horizontal support arm 620 can include one or more reliefs 736, 738, such as to provide clearance from the sash 140 and allow the sash 140 to reach the closed position.

Figure 8:
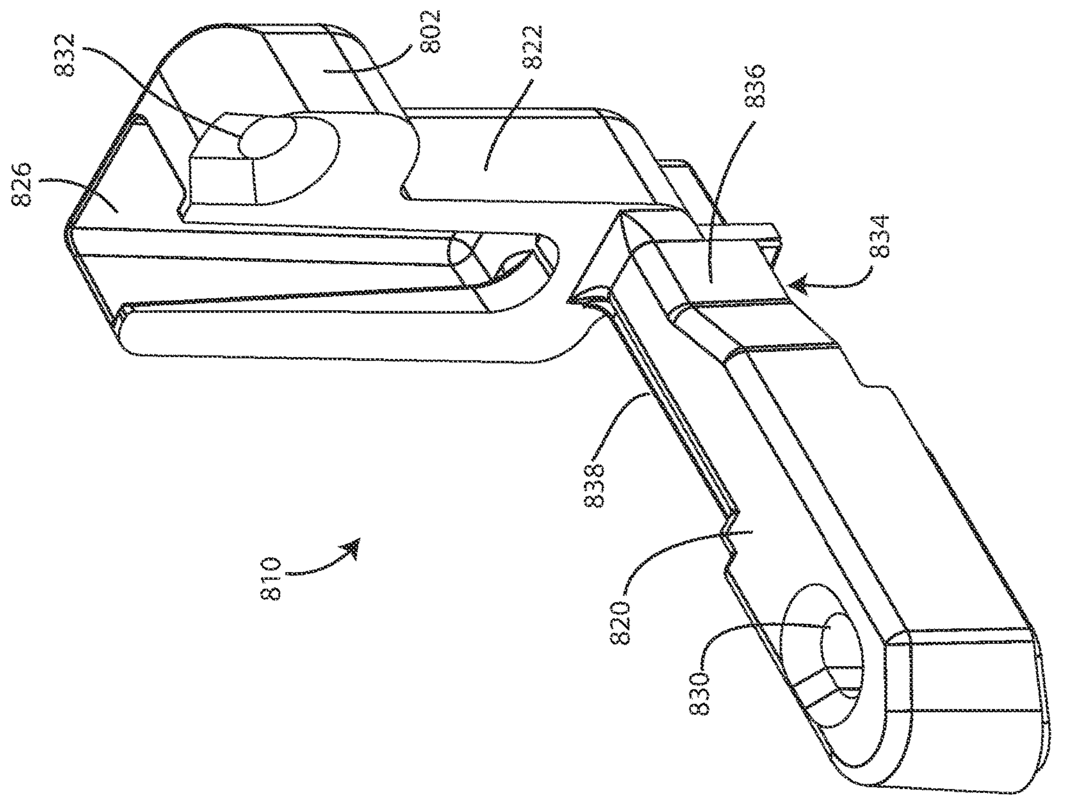
FIG. 8 is a perspective view of a sill corner bracket in accordance with various embodiments herein.

FIG. 8 shows a perspective view of the second sill corner bracket 810. The second sill corner bracket 810 can be a largely mirrored version of the first sill corner bracket 510. The second sill corner bracket 810 can include the same features as the first sill corner bracket 510. The second sill corner bracket 810 can include a horizontal support arm 820 and a vertical support arm 822. The horizontal support arm 820 can define an aperture 830, a recess 834, and two reliefs 836, 838. The vertical support arm 822 can define a channel 826 and an aperture 832. The vertical support arm 822 can further include lobe 802 that is disposed off an interior side (e.g., interior with respect to the interior and exterior sides of the fenestration unit) of the vertical support arm 822, and aperture 832 can be positioned in lobe 802. Lobe 802 can be positioned to the interior side of the fenestration with respect to channel 826.

In some embodiments, aperture(s) to receive fasteners on the vertical support arm of one sill corner bracket (such as aperture 632) can be vertically offset from aperture(s) to receive fasteners on the vertical support arm of the other sill corner bracket (such as aperture 832). This can be significant because fasteners driven through the apertures herein can be sized/designed to pass all the way through the fenestration frame and into a rough opening of a building (such as a rough opening in a wall) in order to more directly transfer loads to structural elements of the building in the rough opening. Such fasteners can be 2, 2.5, 3, 3.5, 4, or 5 inches or longer. Because fenestrations are commonly grouped closely together in a wall, the unit may be installed with mullions, and the fasteners herein can pass through the joining mullion and may physically interfere with one another. As such, a vertical offset of the apertures can allow for fasteners to pass by one another. The vertical offset can be sufficiently large to avoid the fasteners from hitting one another. The vertical offset is not particularly limited, but can be about 0.1, 0.2, 0.3, 0.5, 0.75, 1, 1.25, 1.5, 1.75 or 2 inches or more, ora distance that can fall within a range between any of the foregoing.

In various embodiments, the fastener apertures 632, 832 on the vertical support arms can be positioned such that they are adjacent an interior side (or interior fenestration side) of the vertical support arms. This can make it more likely that when fasteners are inserted into the apertures and then pass through the fenestration frame and into a rough opening of the building, such fasteners will enter a stronger structural part of the rough opening (such as a framing member) versus a less strong wall covering, fascia, or the like.

Figure 9:
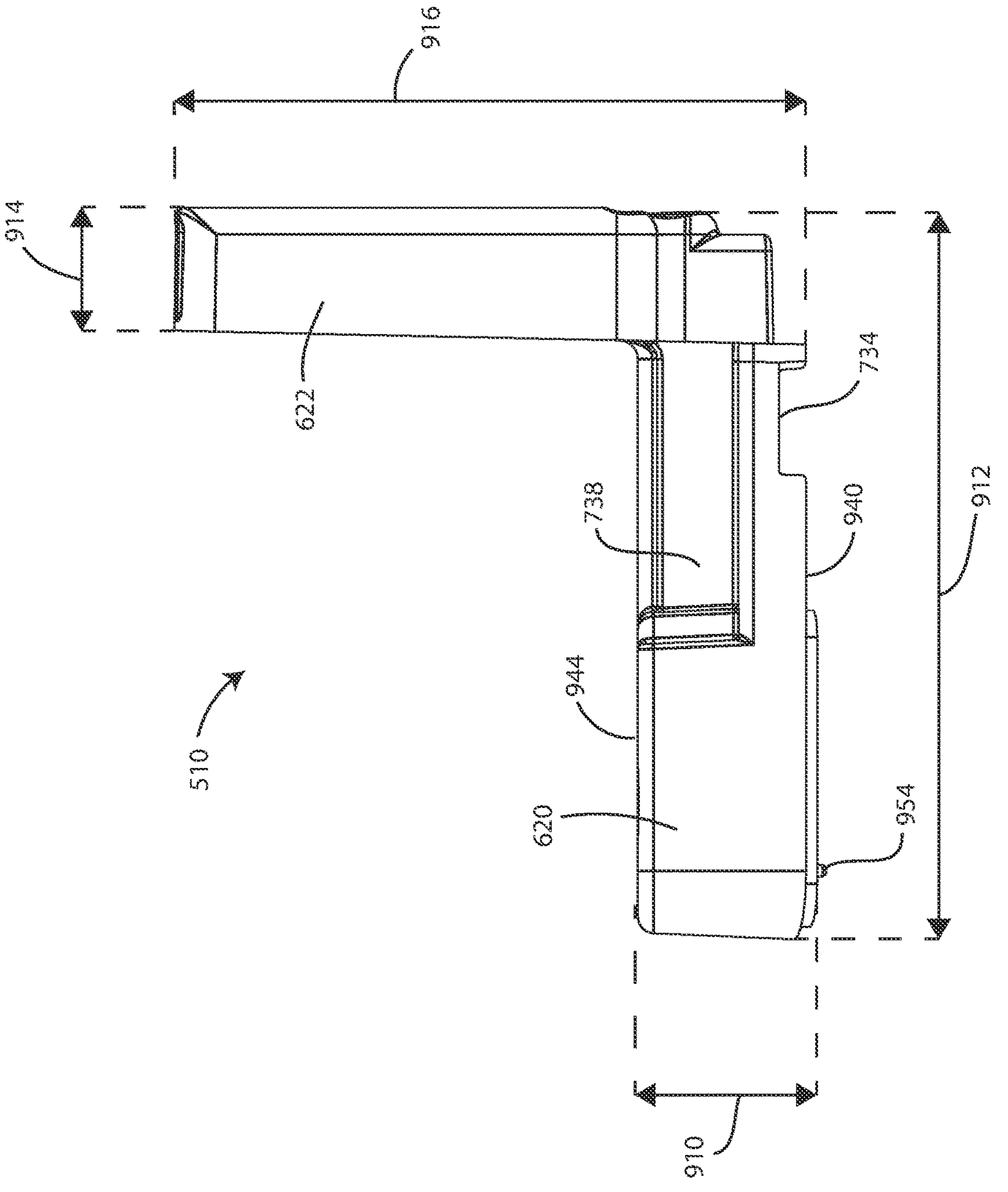
FIG. 9 is a front view of a sill corner bracket in accordance with various embodiments herein.
Figure 10:
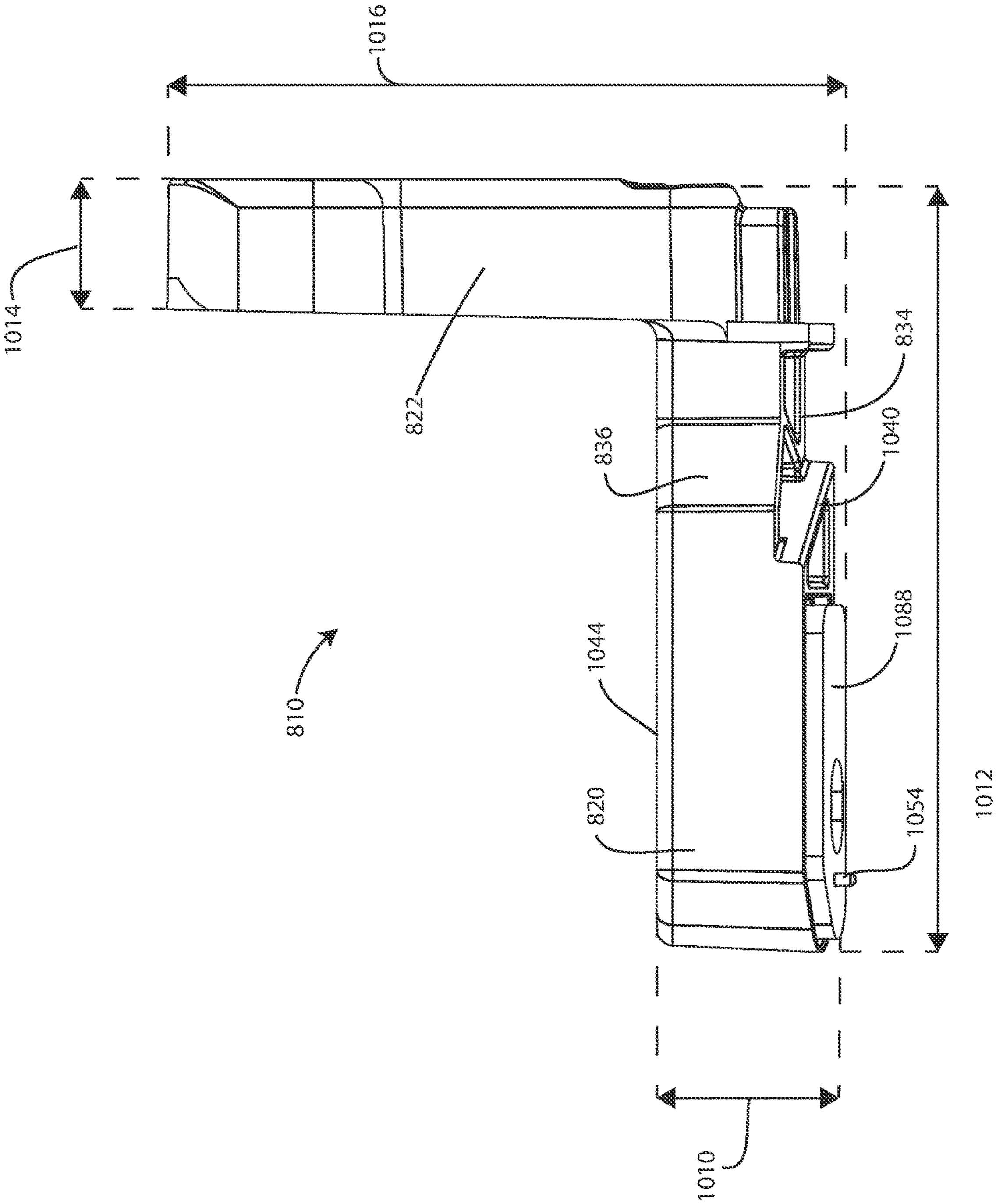
FIG. 10 is a front view of a sill corner bracket in accordance with various embodiments herein.

FIGS. 9 and 10 show front views of the first sill corner bracket 510 and the second sill corner bracket 810, respectively. The horizontal support arms 620, 820 can be substantially perpendicular to the vertical support arms 622, 822.

In some embodiments, the bottom surface 940, 1040 of the horizontal support arms 620, 820 can be angled with respect to a horizontal plane passing through the horizontal support arm 620, 820. This can be seen in FIG. 10. The angle can be configured to match a sill slope of a fenestration unit onto which the sill bracket system is mounted. Thus, in some embodiments, the top surface 944, 1044 of the horizontal support arm 620, 820 is not parallel with the bottom surface 940, 1040. For example, the horizontal support arms 620, 820 of the first and second sill corner brackets can each define a top surface 944, 1044 in a first plane and a bottom surface 940, 1040 in a second plane, wherein the first and second planes are not parallel. In this configuration, a bottom surface 940, 1040 of the horizontal support arms 620, 820 of the sill corner brackets 510, 810 can be angled with respect to a top surface 944, 1044 of the horizontal support arms 620, 820 of the sill corner brackets 510, 810. In some embodiments, the angle can from 1 to 15 degrees.

In various embodiments, the bottom surface 940, 1040 can include one or more locator pins 954, 1054. The locator pins 954, 1054 can be projections that extend downward from the bottom surface 940, 1040. The locator pins 954, 1054 can be aligned and inserted within predrilled holes in the sill 110 to ensure the sill corner brackets are aligned properly with the sill 110.

In various embodiments, the bottom surface 940, 1040 can include a gasket 1088. The gasket 1088 can seal the penetrations in the sill 110, such as to ensure water does not penetrate into the sill 110.

In some embodiments, the horizontal support arm 620, 820 can have a height 910, 1010 of at least 0.25 inches and not more than 2 inches. In some embodiments, the horizontal support arm 620, 820 can have a length 912, 1012 of at least 0.5 inches and not more than 6 inches.

In some embodiments, the vertical support arm 622, 822 can have a height 914, 1014 of at least 0.25 inches and not more than 2 inches. In some embodiments, the vertical support arm 622, 822 can have a length 916, 1016 of at least 0.5 inches and not more than 6 inches.

Figure 11:
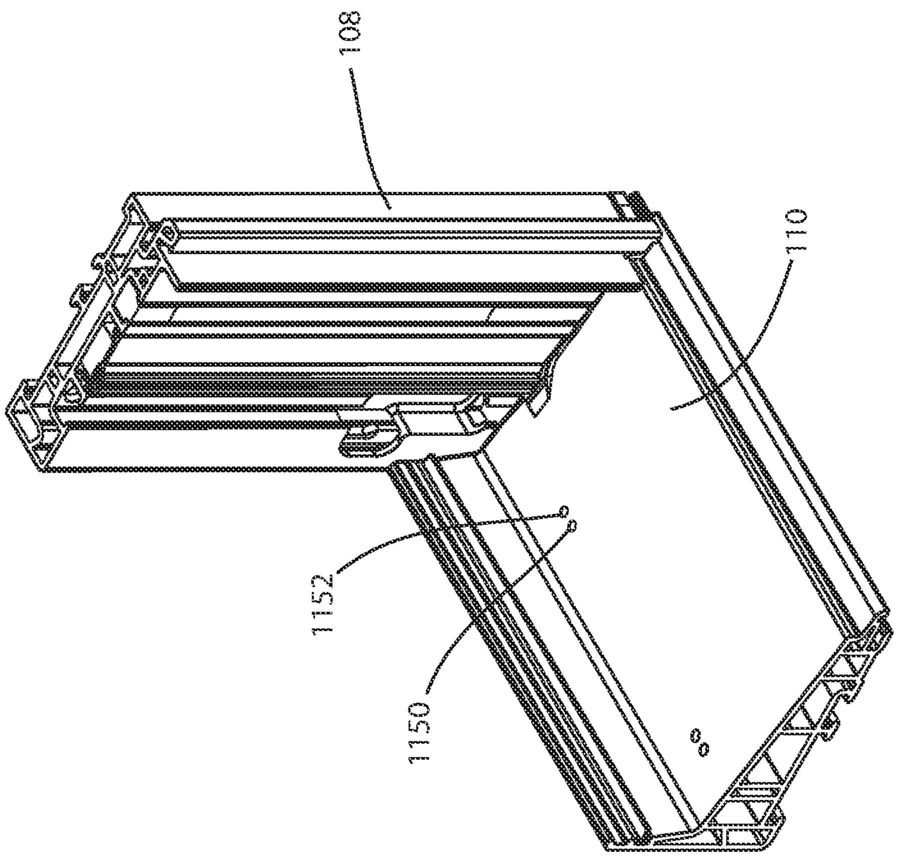
FIG. 11 is a perspective view of a portion of a frame assembly during installation in accordance with various embodiments herein.

In reference now to FIGS. 11-15, various steps are shown for the installation of the sill corner brackets. FIG. 11 shows the side jamb 108 and sill 110 arranged in their installation positions. The sill 110 can include one or more pre-drilled holes 1150, 1152, such as to receive a locator pin from the bottom of the sill corner bracket. The frame 102 can be squared and shimmed into place prior to installing the sill corner brackets.

Figure 12:
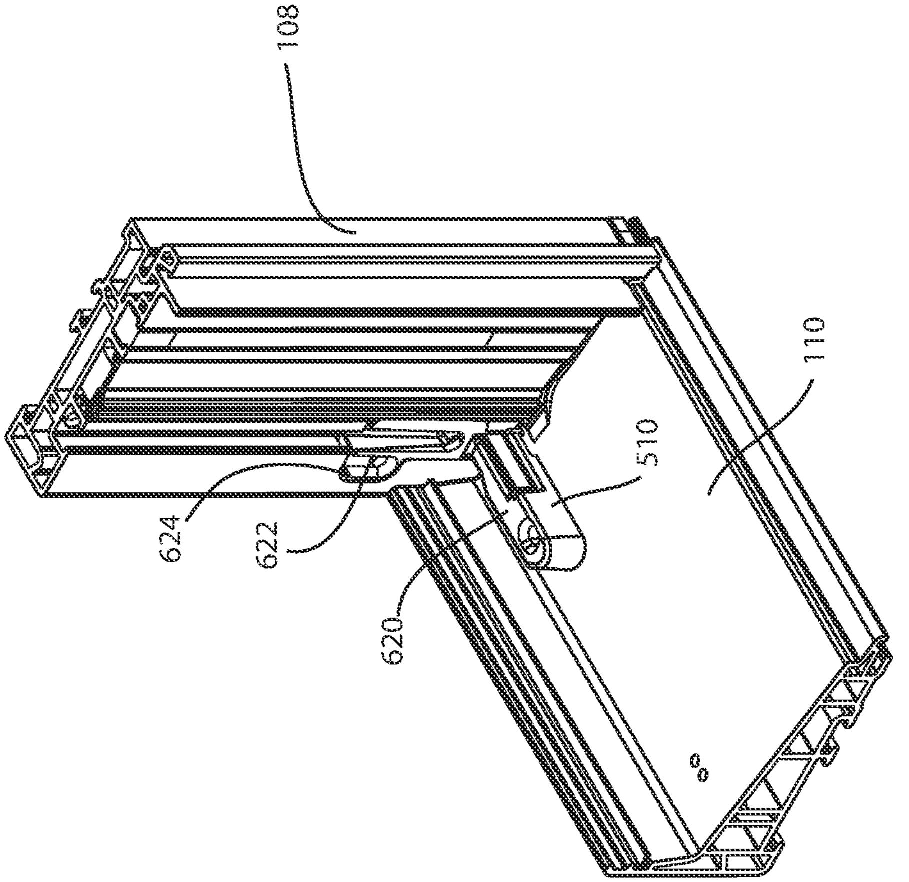
FIG. 12 is a perspective view of a portion of a frame assembly during installation in accordance with various embodiments herein.

In FIG. 12, the first sill corner bracket 510 has been disposed in its desired location. The locator pins on bracket 510 can be disposed within the holes, and the vertical support arm 622 can be disposed within the recess 624. Once the corner bracket 510 has been aligned properly, holes can be drilled into the sill 110 and the jamb 108 through apertures 630, 632 in the sill corner bracket 510.

Figure 13:
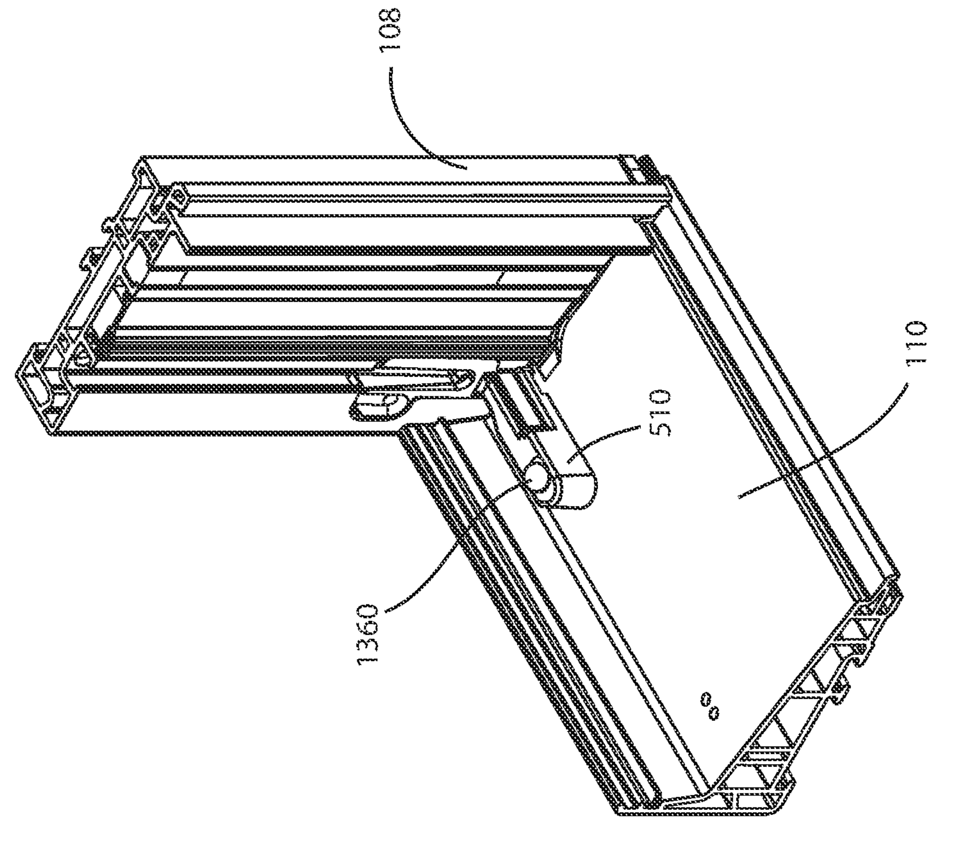
FIG. 13 is a perspective view of a portion of a frame assembly during installation in accordance with various embodiments herein.

As shown in FIG. 13, prior to inserting a fastening element, such as a screw or bolt, into the aperture 630 in the horizontal support arm 620, an installer can insert a sealant 1360 within the aperture 630, such as a silicone-based sealant.

Figure 14:
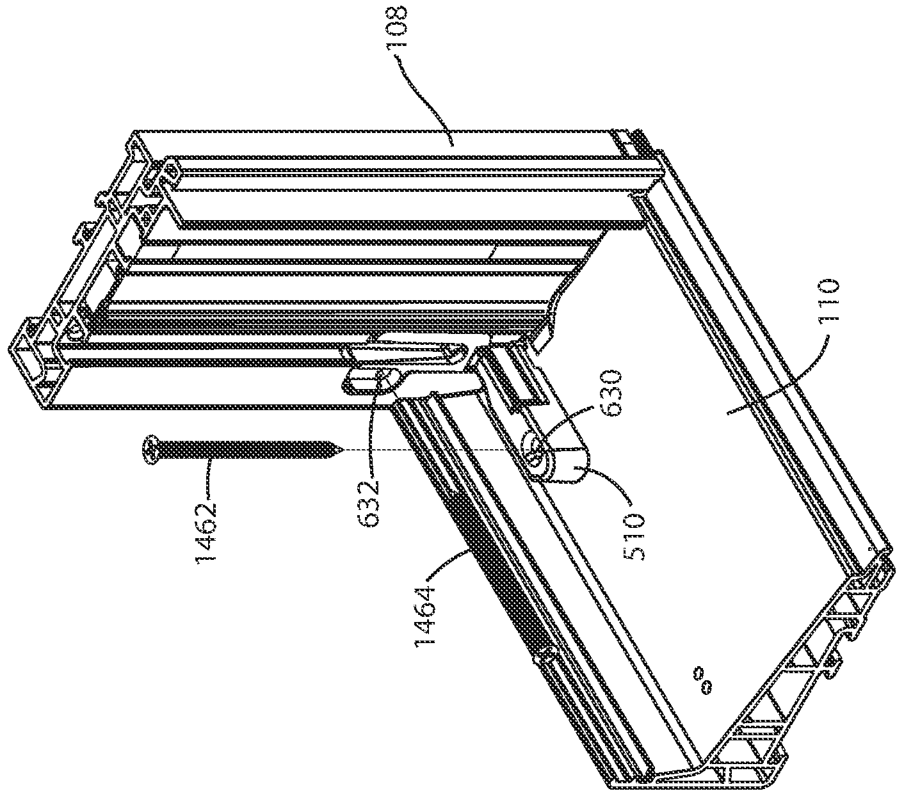
FIG. 14 is a perspective view of a portion of a frame assembly during installation in accordance with various embodiments herein.
Figure 15:
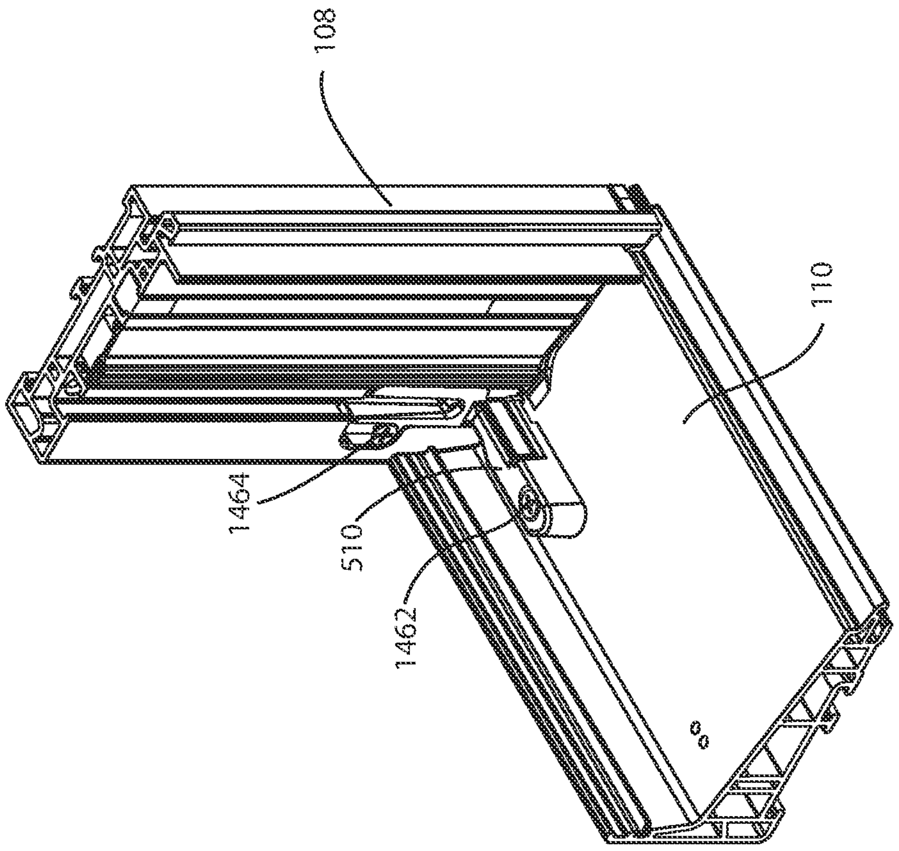
FIG. 15 is a perspective view of a portion of a frame assembly during installation in accordance with various embodiments herein.

FIG. 14 shows fasteners 1462, 1464 being aligned with their respective apertures 630, 632. The fasteners 1462, 1464 can penetrate through the frame 102 and into an area outside the frame 102, such as a rough opening. This is further shown in FIG. 16. The fasteners 1462, 1464 can be inserted into the apertures 630, 632 as shown in FIG. 15. It should be understood that the series of steps depicted in FIGS. 11-15 can be repeated for the second sill corner bracket in the opposite lower corner.

Figure 16:
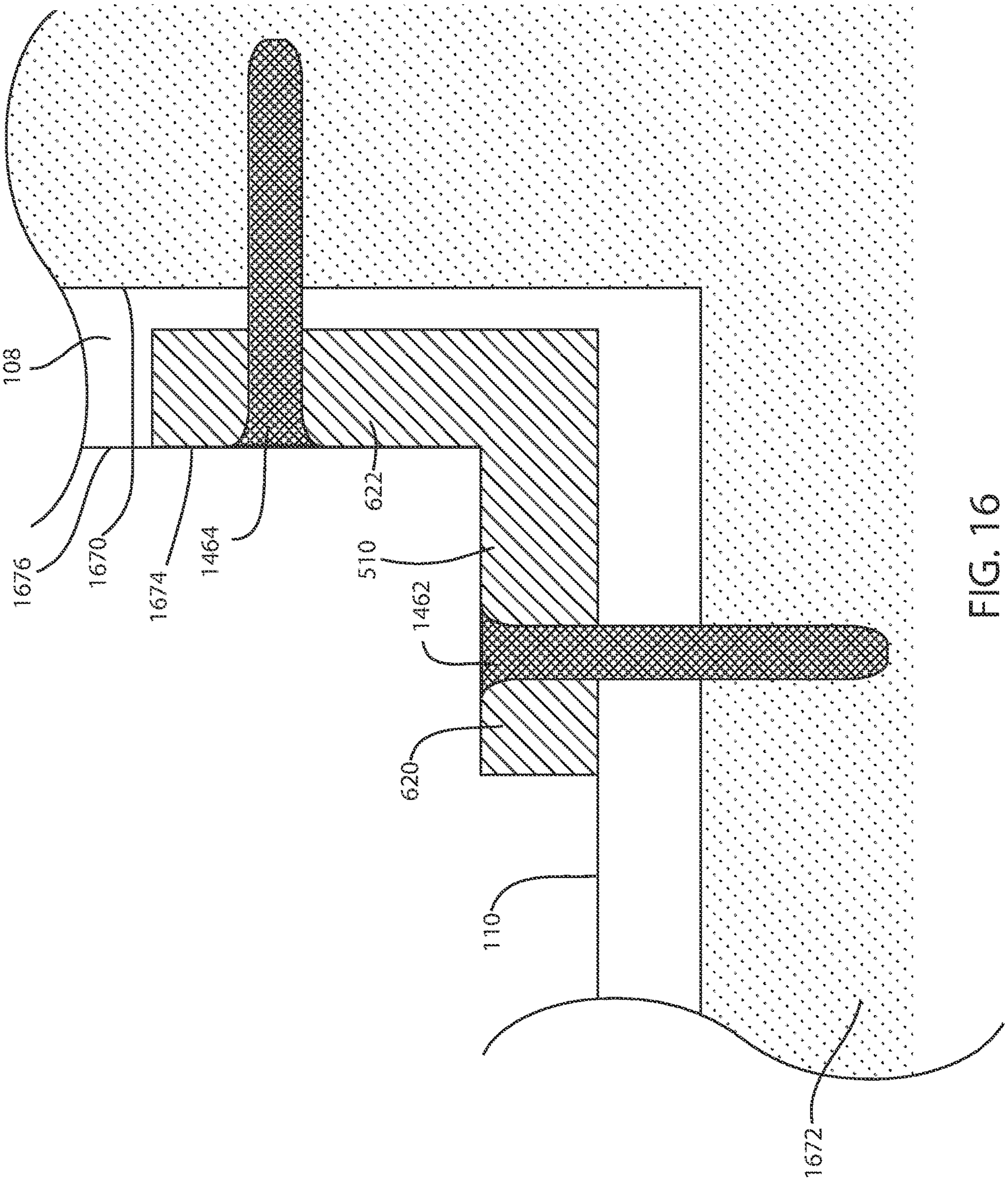
FIG. 16 is a schematic cross-sectional view of a portion of a frame assembly in a rough opening in accordance with various embodiments herein.

FIG. 16 is a schematic cross-sectional view of a portion of a frame assembly 102 in a rough opening 1670 in accordance with various embodiments herein. The building, structure or wall that the fenestration unit 100 is being installed within can define a rough opening 1670 to accommodate the fenestration unit 100. In various embodiments, the fasteners 1462, 1464 can extend through the sill corner bracket, through the sill 110 or side jamb 108 and into the surrounding material 1672. The surrounding material 1672 is an area outside the frame assembly 102. The surrounding material 1672 can include wood, brick, stone, cement, or other construction materials.

FIG. 16 further shows the vertical support arm 622 is inset within the side jamb 108. In various embodiments, the top surface 1674 of the sill corner bracket does not extend past or more inward than the inner surface 1676 of the side jamb 108. In various embodiments, the top surface 1674 can be mounted flush with the inner surface 1676 of the side jamb 108.

Figure 17:
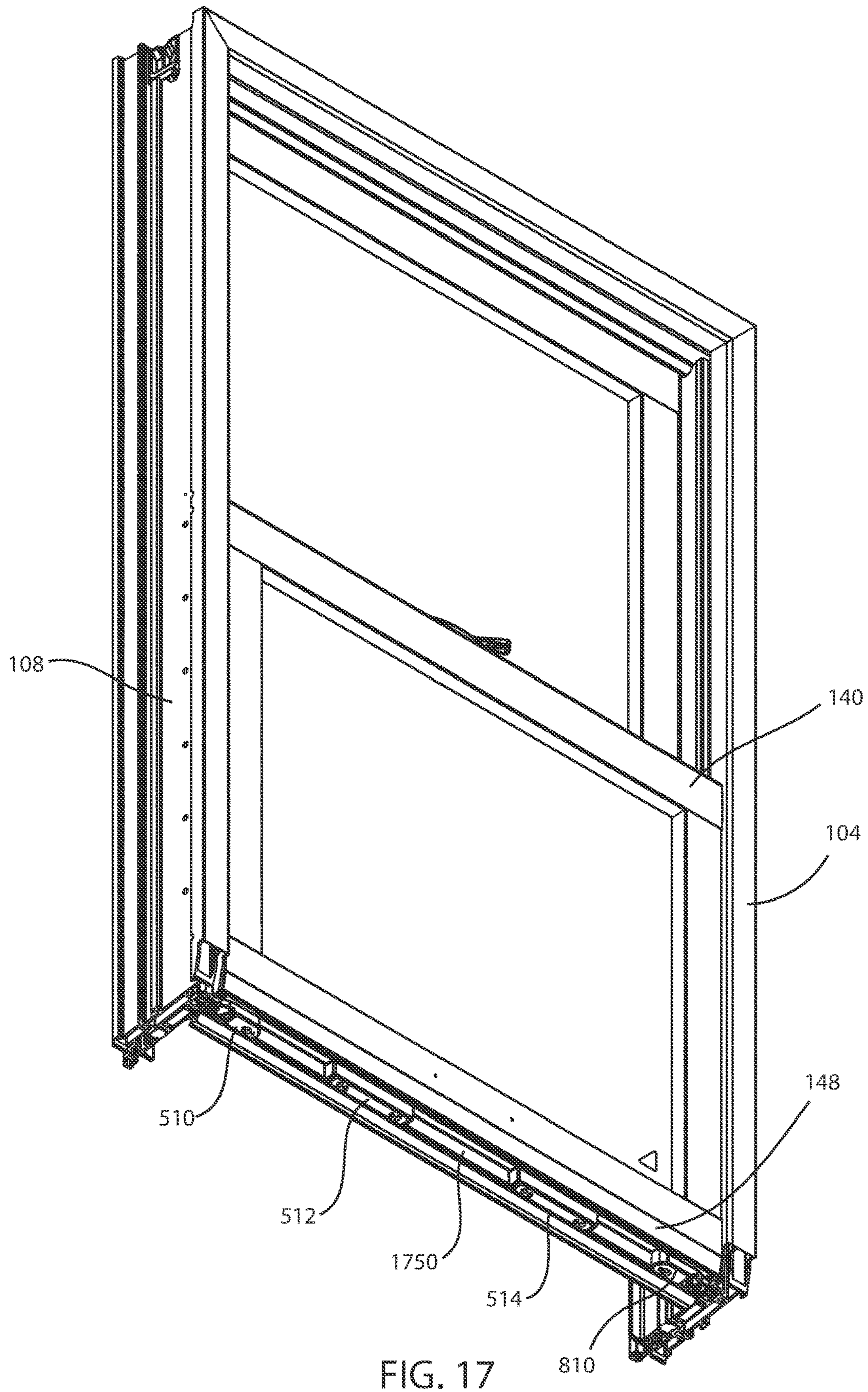
FIG. 17 is a bottom perspective view of a sash in accordance with various embodiments herein.
Figure 18:
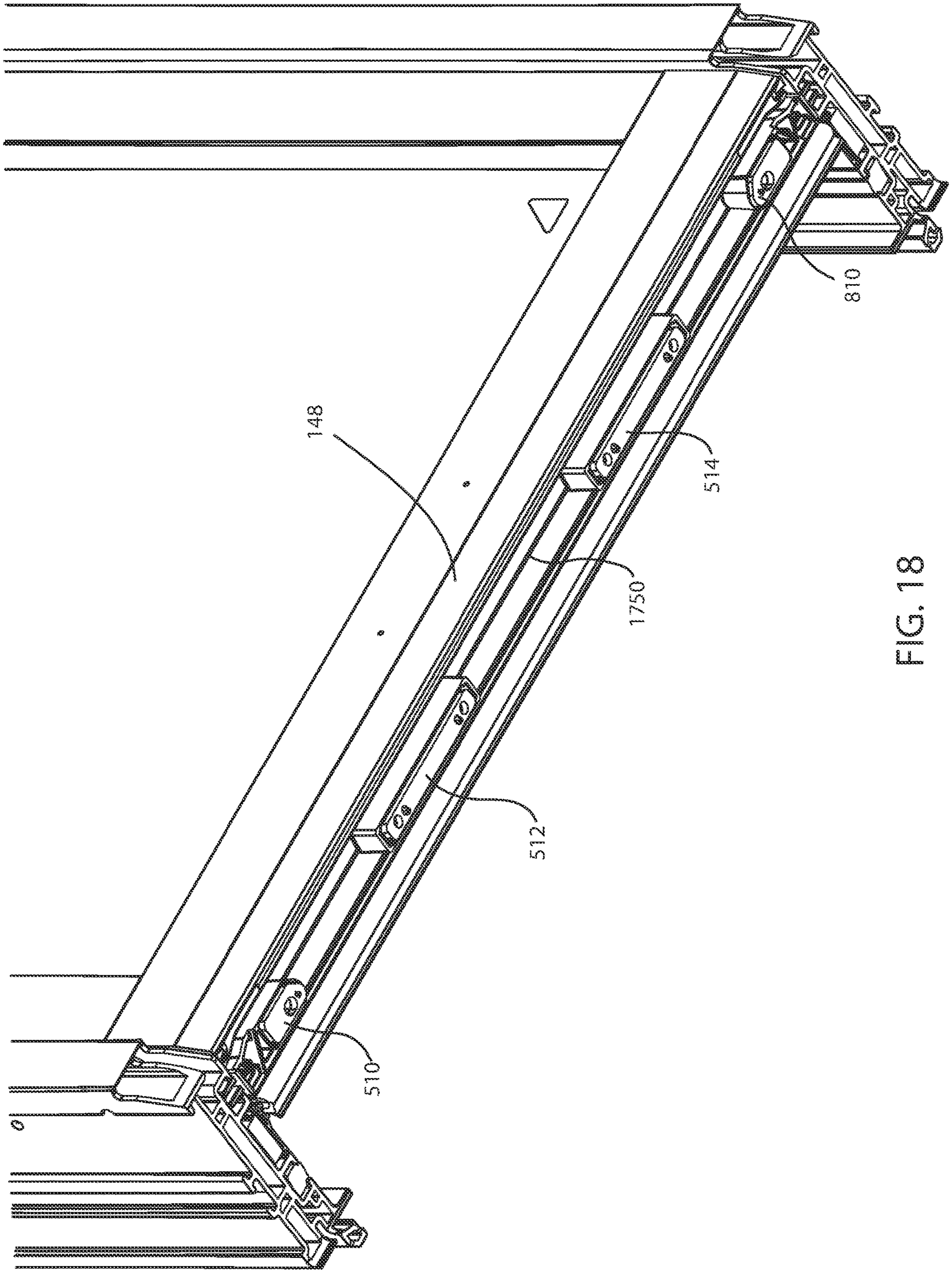
FIG. 18 is a bottom perspective view of a portion of a sash in accordance with various embodiments herein.

In reference now to FIG. 17, a bottom perspective view of a fenestration unit 100 with the sill 110 removed is shown. FIG. 18 shows a similar view as FIG. 17 with additional detail. As mentioned above, the bottom rail 148 can define a channel 1750. The channel 1750 can extend continuously from one end of the bottom rail 148 to the opposite end of the bottom rail 148. In other embodiments, the channel 1750 can be noncontinuous, such as having separated portions of the channel for each of the elements the channel 1750 is configured to receive, such as one separate portion for each of the horizontal support arms 620, 820 and the support blocks 512, 514. The channel 1750 can be configured to receive at least a portion of the sill corner brackets 510, 810 and the support blocks 512, 514. FIGS. 17 and 18 show the sill corner brackets 510, 810 and support blocks 512, 514 disposed within the channel 1750, such as when the sash 140 is in the closed position.

Figure 19:
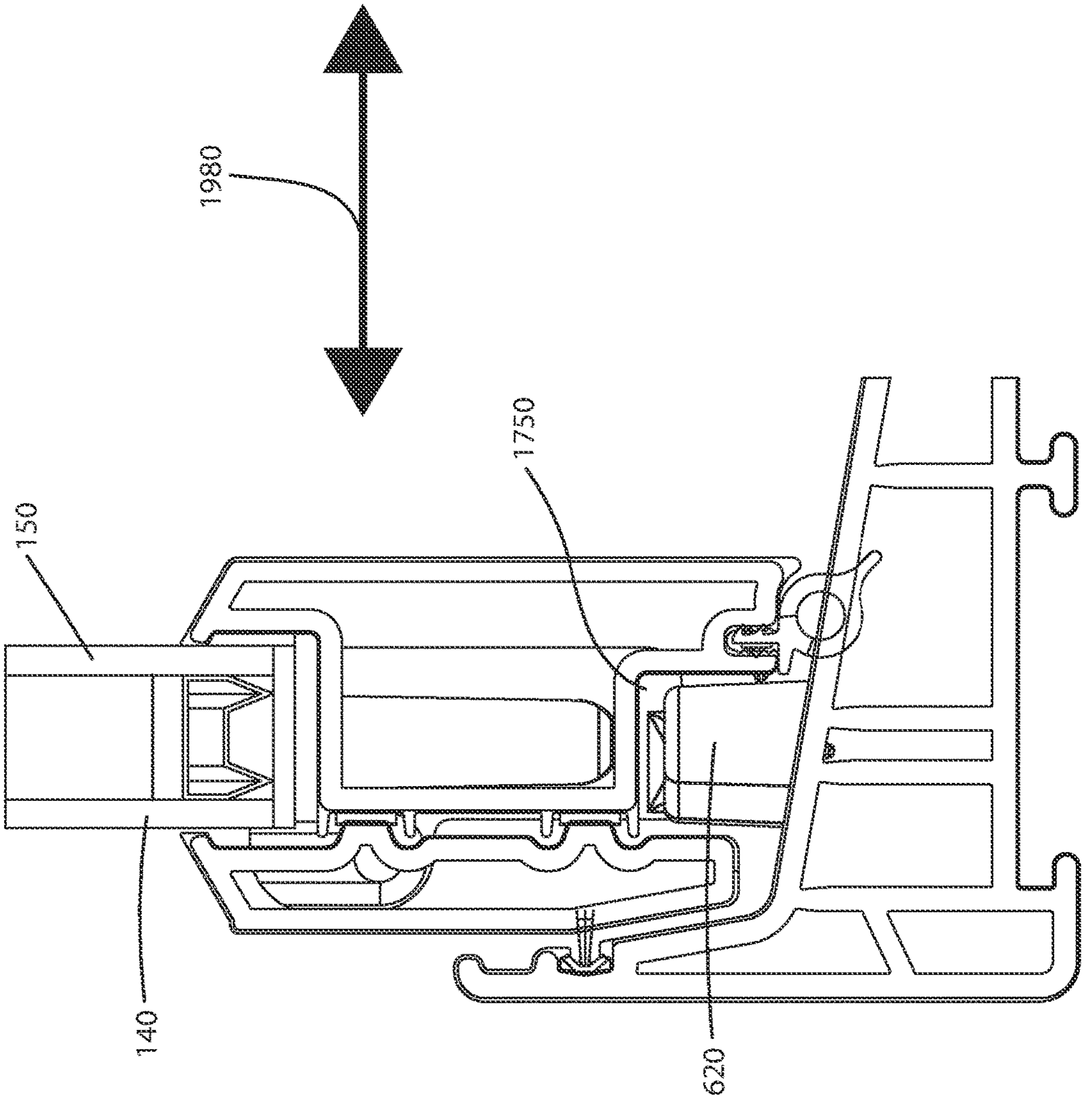
FIG. 19 is schematic cross-sectional view of a portion of the fenestration unit with the bottom sash in a closed position in accordance with various embodiments herein.

FIG. 19 shows a schematic cross-sectional view of a portion of the fenestration unit with the bottom sash in a closed position in accordance with various embodiments herein. As discussed above, the fenestration units disclosed herein can provide greater impact resistance than other fenestration units. When the bottom sash is in the closed position, the sill corner brackets can be hidden from view, such that they are not visible from a standard viewing position. The sill corner brackets can be surrounded by the sill on the bottom side, the bottom sash on the two sides, the top side, and the end side, and the side jamb on the final side. As a result of being surrounded by these portions of the fenestration unit 100, the sill corner brackets can be covered or non-visible.

As shown in FIG. 19, the horizontal support arm 620 of the first sill corner bracket 510 is disposed within the channel 1750. Upon an impact to the bottom sash 140, energy can be transferred from the bottom sash 140 to the rough opening. An impact to the bottom sash 140 in the general direction of arrow 1980 can result in the bottom sash 140 attempting to displace in the direction of the impact. A portion of the sill corner brackets 510, 810 can be disposed within the channel 1750. As the bottom sash 140 attempts to become displaced, the channel 1750 defined by the bottom sash 140 can contact the sill corner brackets 510, 810. The contact between the sill corner brackets 510, 810 and the bottom sash 140 can prevent movement and transfer energy from the bottom sash 140, through the sill corner brackets 510, 810, through the fasteners 1462, 1464 and into the rough opening. In many embodiments, the rough opening or building structure can absorb more energy than a fenestration unit. As a result, movement of the fenestration unit resulting in damage to the fenestration unit can be avoided in many scenarios.

Figure 20:
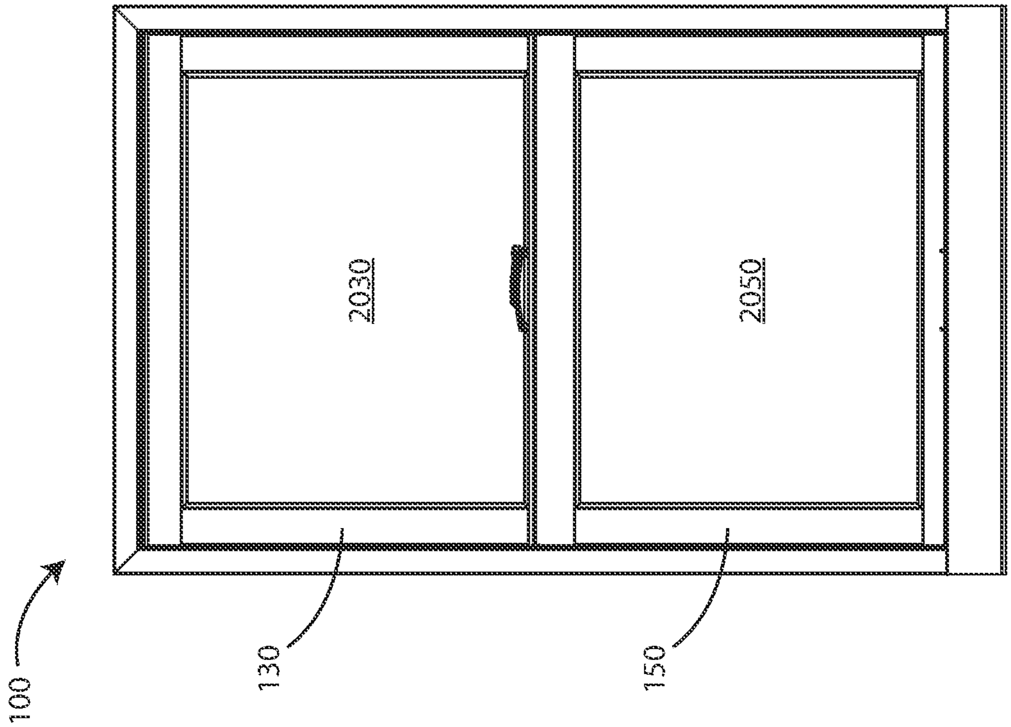
FIG. 20 is an elevation view of an interior side of an impact-resistant fenestration unit in accordance with various embodiments herein.

Embodiments herein can provide high levels of impact resistance while also minimizing or eliminating the visibility (while the fenestration is closed) of hardware components required to achieve the same. As such, embodiments herein can offer desirable sight lines along with remarkable impact resistance. Referring now to FIG. 20, an elevation view is shown of an impact-resistant fenestration unit in accordance with embodiments therein. The impact-resistant fenestration unit 100 is shown as a double-hung unit with a top sash 120 and a bottom sash 140. The top sash 120 includes a transparent central portion 2030 and the bottom sash 140 also includes a transparent central portion 2050. The hardware to provide desirable levels of impact performance is effectively hidden from view. In specific, the sill corner brackets can be hidden from view (not visible) when the bottom sash is in the closed position as shown in FIG. 20.

Figure 21:
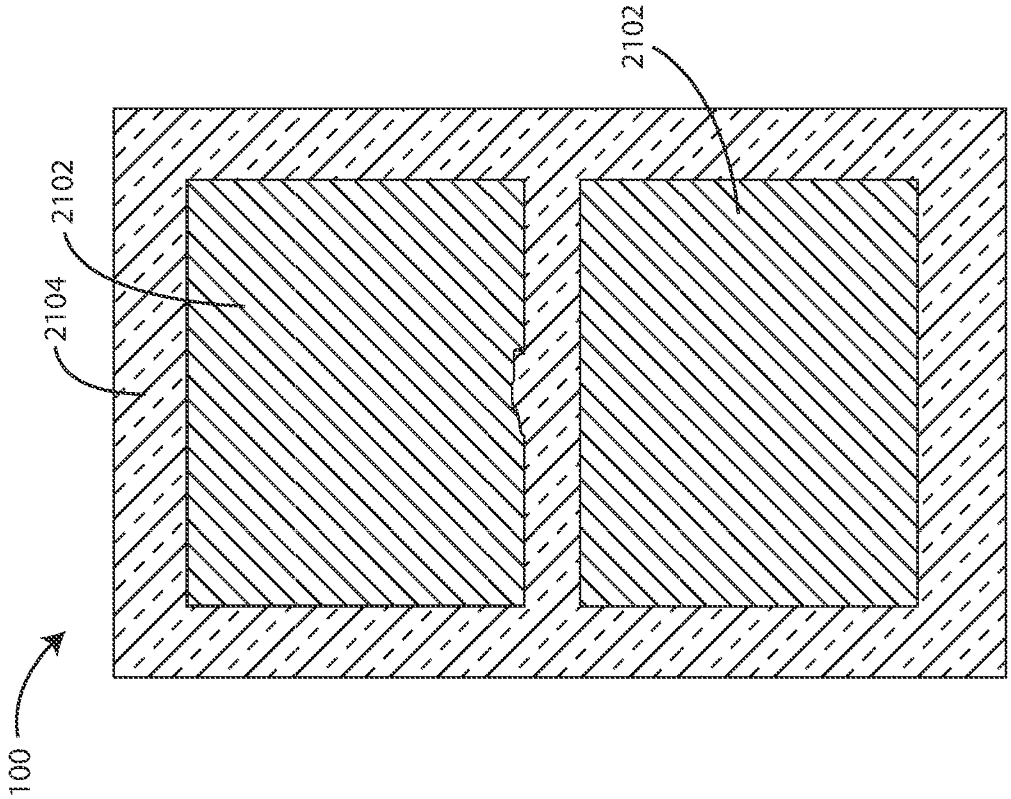
FIG. 21 is a diagram of an interior side of an impact-resistant fenestration unit showing transparent portions thereof in accordance with various embodiments herein.

Embodiments herein can provide high levels of impact resistance while maximizing the area of transparent space relative to the overall area of the fenestration unit. Referring now to FIG. 21, a diagram is shown of an interior side of an impact-resistant fenestration unit showing transparent portions thereof in accordance with various embodiments herein. In specific, the fenestration unit 100 includes transparent areas 2102 (not including any possible grills that might be present) as well as non-transparent area 2104. The proportion of transparent area to the total area of the fenestration (e.g., the sum of both transparent and non-transparent areas) calculated as a percent can be higher than 50%, 55%, 60%, 65%, 70%, 75%, 80%, or more, or an amount falling within a range between any of the foregoing.

Methods

Many different methods are contemplated herein, including, but not limited to, methods of making, methods of using, and the like. Aspects of system/device operation, construction, and/or installation described elsewhere herein can be performed as operations of one or more methods in accordance with various embodiments herein.

Figure 22:
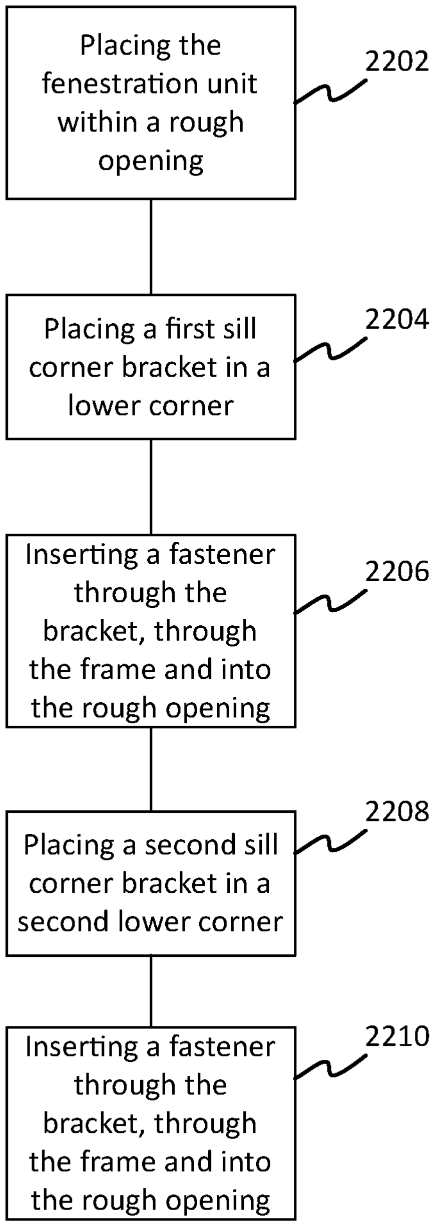
FIG. 22 is a flowchart depicting a method in accordance with various embodiments herein.

FIG. 22 is a flowchart depicting a method of securing an impact-resistant fenestration unit to a rough opening in accordance with various embodiments herein. In various embodiments, the method can include placing the impact-resistant fenestration unit within a rough opening 2202.

The method can include placing a first sill corner bracket on top of a sill of the fenestration unit 2204. The first sill corner bracket can be placed adjacent to a first lower corner of a frame of the fenestration unit. In various embodiments, placing the first sill corner bracket can include recessing a vertical support arm of the first sill corner bracket within a first side jamb of the fenestration unit, such that the vertical support arm is inset within the first side jamb. In various embodiments, placing the first sill corner bracket can include positioning a horizontal support arm of the first sill corner bracket on the sill of the fenestration unit.

The first sill corner bracket can be coupled to the frame and the rough opening. The method can include inserting a fastener through the first sill corner bracket, through the frame, and into the rough opening 2206.

The method can include placing a second sill corner bracket on top of the sill of the fenestration unit 2208. The second sill corner bracket can be placed adjacent to a second lower corner of a frame of the fenestration unit. In various embodiments, placing the second sill corner bracket can include recessing a vertical support arm of the second sill corner bracket within a second side jamb of the fenestration unit, such that the vertical support arm is inset within the second side jamb. In various embodiments, placing the second sill corner bracket can include positioning a horizontal support arm of the second sill corner bracket on the sill of the fenestration unit.

The second sill corner bracket can be coupled to the frame and the rough opening. The method can include inserting a fastener through the second sill corner bracket, through the frame, and into the rough opening 2210.

In various embodiments, the method can further include moving a bottom sash of the impact-resistant fenestration unit into a closed position, where a bottom portion of the bottom sash engages the top of the sill, such that the horizontal support arms are disposed within a channel defined by the bottom portion of the bottom sash.

Figure 23:
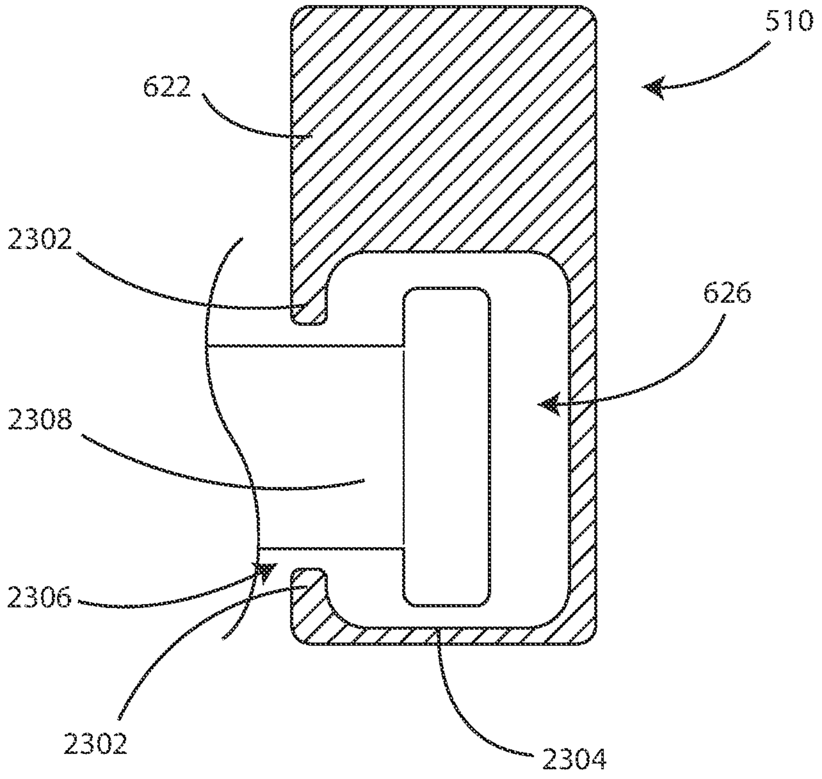
FIG. 23 is a simplified cross-sectional view of a sill corner bracket engaging with a pivot pin in accordance with various embodiments herein.

FIG. 23 is a simplified cross-sectional view of a sill corner bracket 510 engaging with a pivot pin 2308 in accordance with various embodiments herein. As referenced above, the vertical support arm 622 of the sill corner bracket 510 can define a channel 626 or slot. The channel 626 can be configured to accept a portion of the sash or a projection extending from the sash (such as a pivot pin 2308 or balancer tilt pin) when the sash is in the closed position. When the pivot pin 2308 is disposed in the channel 626, substantial strength is gained. In the event of forces promoting motion of the sash (such as in the exterior side to interior side direction or the reverse), the pivot pin 2308 can engage with an interior surface 2304 of the channel 626 thus providing structural support to the pivot pin 2308 and facilitating load transfer from the sash to the frame and onto the rough opening of the building into which the fenestration is mounted. In various embodiments, the bracket 510 can also include a lip 2302 around the side opening 2306 to the channel 626. In various embodiments, the channel 626 can also be tapered such that the cross-sectional area of the channel 626 is less towards the bottom of the channel 626 (e.g., toward the sill of the window) than at the top of the channel 626. In various embodiments, the side opening 2306 to the channel 626 can be tapered such that the opening is smaller in width towards the bottom of the channel 626 (e.g., toward the sill of the window) than at the top of the channel 626. The degree of tapering of the channel 626 and/or the side opening 2306 can influence the amount of movement of the pivot pin 2308 before it engages an interior surface 2304 of the channel 626 and/or the edges of the lip 2302. In some embodiments, the degree of tapering can be sufficient such that the pivot pin (when the sash is in a closed position) need not move or move only very little to engage an interior surface 2304 of the channel 626 and/or the edges of the lip 2302.

Performance Qualities

Various embodiments herein include impact-resistant fenestration units that can achieve various performance standards. Further details about the performance standards are provided as follows. However, it will be appreciated that this is merely provided by way of example.

In some embodiments, the impact-resistant fenestration unit exhibits impact resistance properties satisfying ASTM E1996-17 and/or Florida TAS Standards. In some embodiments, impact-resistant fenestration units herein can withstand the impact of a large projectile, such as in the ASTM/E1886-19/E1996-17 large missile test or TAS 201 and/or 203 large missile test for High Velocity Hurricane Zone. For example, impact-resistant fenestration units herein can withstand a 2×4 weighing approximately 9 pounds shot from a compressed-air cannon at a velocity of 50 feet per second while maintaining structural integrity (such as no tears in the window permitting a 3 inch sphere to pass through and no tears larger than 5 inches in length or no tears longer than 5 inches and wider than $1/16^{th}$ of an inch). In some embodiments, impact-resistant fenestration units herein can withstand the impact of a small projectile. For example, impact-resistant fenestration units herein can withstand a ball bearing weighing approximately 2 grams traveling at a velocity of 130 feet per second without allowing penetration of the same. In some embodiments, impact-resistant fenestration units herein can withstand the impact of projectiles according to ASTM E1886-19 missile levels A, B, C, D, and/or E. In some embodiments, impact-resistant fenestration units herein can withstand the impact of projectiles according to ASTM E1886-19 missile levels A and D.

In various embodiments, the impact-resistant fenestration unit exhibits High-Velocity Hurricane Zones (HVHZ) Wind Zone 4 impact resistance properties. In some embodiments, impact-resistant fenestration units herein can withstand HVHZ High-Velocity Hurricane Zones (HVHZ) Wind Zone 4 cyclic pressure differentials. In some embodiments herein, the impact-resistant fenestration unit can satisfy performance requirements as specified in AAMA/WDMA/CSA 101/I.S.2/A440-2017.

In various embodiments, the impact-resistant fenestration unit exhibits exceptional thermal insulation properties. In various embodiments, impact-resistant fenestration units herein exhibit a U factor of less than or equal to 0.50 BTU/h*ft$^2$*° F., less than or equal to 0.45 BTU/h*ft$^2$*° F., less than or equal to 0.40 BTU/h*ft$^2$*° F., less than or equal to 0.35 BTU/h*ft$^2$*° F., or less than or equal to 0.30 BTU/h*ft$^2$*° F.

Lineal Extrusion Materials

Various embodiments herein can be formed with lineal extrusions. For example, sills, jambs, rails, stiles, and the like can be formed from lineal extrusions. Further details about lineal extrusion materials are provided as follows. However, it will be appreciated that this is merely provided by way of example and that further variations are contemplated herein.

In various embodiments, the bottom rail, check rail, and two opposed stiles can be formed from a lineal extrusion that can include a thermoplastic resin. In various embodiments, the sill, side jambs, and top jamb can be formed from a lineal extrusion that can include a thermoplastic resin.

In some embodiments, the portion of thermoplastic resin can include at least 50 percent by weight of the total weight of materials forming the lineal extrusion other than processing aids can be equal to 40, 45, 50, 55, 60, 65, 70, 75, 80, 85, 90, 95, or 100 percent by weight, or can be an amount falling within a range between any of the foregoing. Exemplary thermoplastic resins are described in greater detail below, but in various embodiments, the thermoplastic resin can include polyvinylchloride. In some embodiments, the lineal extrusion can be a composite, such as a composite of thermoplastic resin and glass fibers. For example, in some embodiments at least one of the bottom rail, check rail, and two opposed stiles includes a portion can include a composite including a thermoplastic resin and glass fibers.

In various embodiments, at least one of the bottom rail, check rail, and two opposed stiles includes a portion including a thermoplastic resin, but without glass fibers, along with a portion including a composite including a thermoplastic resin and glass fibers.

In some embodiments, composite materials herein can include a polymeric resin, fibers, and at least one of particles and an impact modifier. Many different specific formulations are contemplated and details of exemplary compositions are described in U.S. patent application Ser. Nos. 15/439,586 and 15/439,603, the content of which is herein incorporated by reference. However, in some embodiments, the composite material can include a polymer resin, fibers, and, in some cases, at least one component selected from the group consisting of at least 1% by weight particles and at least 5 phr impact modifier. However, in other embodiments, the composite material may only include a polymer resin and fiber, lacking particles and/or an impact modifier. Details of these components are described in more detail below.

Some embodiments of composite materials herein have a remarkably high modulus of elasticity. For example, in various embodiments such materials can have a modulus of elasticity of 800,000, 900,000, 1,000,000, 1,100,000, 1,200, 000, 1,300,000, 1,400,000, 1,500,000, 1,600,000, 1,700,000, 1,800,000, 1,900,000, 2,000,000, 2,200,000, 2,400,000, 2,600,000, 2,800,000, 3,000,000, 3,500,000 or 4,000,000 psi, or within a range between any of the foregoing. By comparison, some embodiments of composites with the same or similar polymeric resins, but lacking fibers and impact modifier have a modulus of elasticity of about 850,000. By way further comparison, non-composite vinyl (PVC) compositions can have a modulus of elasticity of 300,000 to 500,000 psi. In various embodiments, an extruded article can include a second composition, which can be an advanced composite herein, having a modulus of elasticity at least 50,000 psi higher than a first composition, wherein the second composition is different than the first composition. In some embodiments, the second composition can have a modulus of elasticity at least 100,000, 250,000, 500,000, 750,000, 1,000,000, 1,250,000, 1,500,000, 1,750, 000, 2,000,000, or 2,500,000 psi higher than the first composition. In some embodiments, the second composition can have a modulus of elasticity at least 10, 20, 30, 40, 50, 60, 70, 80, 100, 200, 300, 400, 500, 600, 700, or 800 percent higher than the first composition.

Descriptions herein of exemplary particles are only applicable for the description of embodiments herein and not for other patents or patent applications of the applicant and/or inventors unless explicitly stated to the contrary.

Particles herein can include both organic and inorganic particles. Such particles can be roughly spherical, semispherical, block-like, flat, needle-like (acicular), plate-like (platy), flake-like (flaky), or other shape forms. Particles herein can have substantial variation. As such, the particles added to compositions in some embodiments can form a heterogeneous mixture of particles. In other embodiments, the particles can be substantially homogeneous.

In some embodiments, the particles used with compositions herein can have an aspect ratio of between about 15:1 and about 1:1. In some embodiments, particles herein can have an aspect ratio of between about 10:1 and about 1:1. In some embodiments, particles herein can have an aspect ratio of between about 8:1 and about 1:1. In some embodiments, particles herein can have an aspect ratio of between about 7:1 and about 1:1. In some embodiments, particles herein can have an aspect ratio of between about 6:1 and about 1:1. In some embodiments, particles herein can have an aspect ratio of between about 5:1 and about 1:1. In some embodiments, particles herein can have an aspect ratio of between about 4:1 and about 1:1. In some embodiments, particles herein can have an aspect ratio of between about 3:1 and about 1:1. In some embodiments, particles herein can have an aspect ratio of between about 2:1 and about 1:1. Such aspect ratios can be assessed by first taking the largest dimension of the particle (major axis) and then comparing it with the next largest dimension of the particle that is perpendicular to the major axis.

In various embodiments, the particles can be, on average, from about 0.01 mm to about 8 mm in their largest dimension (or major axis or characteristic dimension). In various embodiments, the particles can be from about 0.25 mm to about 5 mm in their largest dimension. In various embodiments, the particles can have an average size of about 0.1 mm to about 2.5 mm in their largest dimension. In various embodiments, the particles can have an average size of about 0.18 mm to about 0.6 mm in their largest dimension. In various embodiments, the particles can have an average size of greater than about 0.6 mm in their largest dimension. For example, in various embodiments, the particles can have an average size of about 0.6 mm to about 3.0 mm in their largest dimension. In various embodiments, the particles can have an average size of about 0.5 mm to about 2.5 mm in their largest dimension. In various embodiments, the particles can have an average size of about 1 mm to about 2 mm in their largest dimension.

In some embodiments, the particles can have an average size of their largest dimension falling within a range wherein the lower bound and the upper bound can be any of the following sizes (provided that the upper bound is greater than the lower bound): 0.01 mm, 0.02 mm, 0.03 mm, 0.05 mm, 0.07 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, 3.0 mm, 3.5 mm, 4.0 mm, 4.5 mm, 5.0 mm, 5.5 mm, 6.0 mm, 6.5 mm, 7.0 mm, and 8.0 mm.

In some embodiments, the particles are organic particles and can have an average size of their largest dimension falling within a range wherein the lower bound and the upper bound can be any of the following sizes (provided that the upper bound is greater than the lower bound): 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, and 3.0 mm.

In some embodiments, the particles are inorganic particles and can have an average size of their largest dimension falling within a range wherein the lower bound and the upper bound can be any of the following sizes (provided that the upper bound is greater than the lower bound): 0.01 mm, 0.02 mm, 0.03 mm, 0.05 mm, 0.07 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, and 3.0 mm.

As referenced above, aspect ratios can be assessed by first taking the largest dimension of the particle (major axis) and then comparing it with the next largest dimension of the particle along an axis (Y axis) that is perpendicular to the major axis (X axis). The depth or Z axis measure (Z axis) can be measured along an axis that is perpendicular to both the X and Y axes used to specify the aspect ratio. In some embodiments, particles herein can have an average or maximum depth or Z axis measure in the context of the aspect ratios described above that is equal to at least about 0.1, 0.2, 0.3, 0.4, 0.5, 0.6, 0.7, 0.8, 0.9, or 0.95 of the smaller of the two dimensions used to assess aspect ratio.

It will be appreciated that the dimensions of particles can change during processing steps associated with the creation of extruded articles including, but not limited to, steps of compounding and/or extruding. As such, in some embodiments the foregoing measures of aspect ratio and size can be as measured before such processing steps or as measured after such processing steps.

It will be appreciated that in many embodiments not every particle used will be identical in its dimensions and, as such, the foregoing dimensions can refer to the average (mean) of the particles that are used.

Particles herein can include materials such as polymers, carbon, organic materials, inorganic materials, composites, or the like, and combinations of these. Polymers for the particles can include both thermoset and thermoplastic polymers. Inorganic particle materials can include, but are not limited to silicates. Inorganic particle materials can specifically include, but are not limited to, glass beads, glass bubbles, minerals such as mica and talc, and the like.

Particles herein can specifically include organic particles. Particles herein can specifically include particles comprising substantial portions of lignin, hemicellulose and cellulose (lignocellulosic materials), such as wood particles or wood flour. Wood particles can be derived from hardwoods or softwoods. In various embodiments, the wood particles can have a moisture content of less than about 8, 6, 4, or 2 percent.

In various embodiments, the wood particles can be a heterogeneous mixture of wood particles, wherein at least about 50, 60, 70, 80, 90, or 95 weight percent of the particles are 80 Mesh or larger (or 80 sieve size—corresponding to a pore size of 0.177 mm and a particle size of approximately 0.180 mm).

In various embodiments, the wood particles can be a heterogeneous mixture of wood particles, wherein at least about 50, 60, 70, 80, 90, or 95 weight percent of the particles are 80 Mesh or larger (or 80 sieve size—corresponding to a pore size of 0.177 mm and a particle size of approximately 0.180 mm) and less than 9 Mesh (or 10 sieve size—corresponding to a pore size of 2.00 mm).

In various embodiments, the wood particles can be a heterogeneous mixture of wood particles, wherein at least about 50, 60, 70, 80, 90, or 95 weight percent of the particles are 28 Mesh or larger (or 30 sieve size—corresponding to a pore size of 0.595 mm and a particle size of approximately 0.6 mm).

In various embodiments, the wood particles can be a heterogeneous mixture of wood particles, wherein at least about 50, 60, 70, 80, 90, or 95 weight percent of the particles are 28 Mesh or larger (or 30 sieve size—corresponding to a pore size of 0.595 mm and a particle size of approximately 0.6 mm) and less than 9 Mesh (or 10 sieve size—corresponding to a pore size of 2.00 mm).

Other biomaterials or other organic materials may also be used as particles. As used herein, the term "biomaterial" will refer to materials of biological origin, such as wood fiber, hemp, kenaf, bamboo, rice hulls, and nutshells. More generally, other lignocellulose materials resulting from agricultural crops and their residues may also be used as particles.

In some embodiments, particles herein can include inorganic materials such as metal oxide particles or spheres, glass particles, or other like materials. These particles may be used either alone or in combination with other organic or inorganic particles.

Particles used herein can include newly synthesized or virgin materials as well as recycled or reclaimed materials or portions of recycled materials. In some embodiments, reclaim streams can be from the composition herein or from other extrusion, molding, or pultrusion compositions. As such, in some embodiments particles herein can include portions of multiple materials.

In various embodiments, the particles can be substantially uniformly dispersed within a given extruded composition.

In some embodiments, the particles used herein can include a single particle type in terms of material and dimensions, and in other embodiments can include a mixture of different particle types and/or fiber dimensions. In some embodiments, the particles used herein can include a first particle type and/or size in combination with a second particle type and/or size.

In various embodiments, particles used herein can be coated with a material. By way of example, particles can be coated with a lubricant, a tie layer, or other type of compound.

The amount of the particles used in the composition can vary based on the application. In some embodiments, the amount of particles in the extruded composition with fibers can be greater than or equal to about 1, 2, 4, 6, 8, 10, 15, 20, 25, or 30 wt. % (calculated based on the weight of the particles as a percent of the total weight of the extruded composition in which the particles are disposed). In some embodiments, the amount of particles in the extruded composition with fibers can be less than or equal to about 80, 75, 70, 65, 60, 55, 50, 45, 40, 35, 30, 25, 20, 15, 10, or 5 weight percent. In some embodiments, the amount of particles can be in a range wherein each of the foregoing numbers and serve as the upper or lower bound of the range provided that the upper bound is larger than the lower bound.

The amount of particles in the extruded composition, as measured based on volume, can be greater than or equal to about 1, 2, 3, 4, 5, 6, 7, 8, 9, 10, 12, 14, 16, 18, 20, 22, 24, 26, 28, 30, 32, 34, or 36 percent of the total composition. In some embodiments, the amount of particles as measured based on volume can be in a range wherein any of the foregoing amounts can serve as the upper or lower bound of the range.

It will be appreciated that in some embodiments, some amount of out of specification particles can also be included. As such, in some embodiments, at least 50, 60, 70, 80, 90, 95, or 98 wt. % of the total particle content of the composition are those such the particles described above. For example, in some embodiments at least 50 wt. % of the particles are selected from the group consisting of organic particles having an average largest dimension of greater than 100 microns and an aspect ratio of 4:1 or less and inorganic particles having an average largest dimension of greater than 10 microns and an aspect ratio of 4:1 or less.

In some embodiments, composites herein including fibers can specifically include non-aligned fibers. As used herein, the term "non-aligned" with regard to fiber orientation shall refer to the state of fibers in an extrusion with their lengthwise axis not exhibiting the same degree of alignment (e.g., parallel to) to the direction of extrusion that an otherwise similar composition lacking particles as described herein would assume after going through an extrusion process. Non-aligned fibers can exhibit an average offset angle relative to the extrusion direction of greater than 20 degrees.

As used herein, the term "substantially random" with regard to fiber orientation shall refer to the state of the fibers in an extrusion with their lengthwise axis not being substantially aligned in parallel with the direction of extrusion of the article. The phrase "substantially random" does not require the orientation of the fibers to be completely mathematically random.

Descriptions herein of exemplary fibers are only applicable for the description of embodiments herein and not for other patents or patent applications of the applicant and/or inventors unless explicitly stated to the contrary. Various embodiments of compositions and extrudates herein include a fiber component.

The fiber component can include fibers of various types and in various amounts. Exemplary fibers can include cellulosic and/or lignocellulosic fibers. By way of example, fibers used in embodiments herein can include materials such as glasses, polymers, ceramics, metals, carbon, basalt, composites, or the like, and combinations of these. Exemplary glasses for use as fibers can include, but are not limited to, silicate fibers and, in particular, silica glasses, borosilicate glasses, alumino-silicate glasses, alumino-borosilicate glasses and the like. Exemplary glass fibers can also include those made from A-glass, AR-glass, D-glass, E-glass with boron, E-glass without boron, ECR glass, S-glass, T-glass, R-glass, and variants of all of these. Exemplary glass fibers include 415A-14C glass fibers, commercially available from Owens Corning.

Exemplary polymers for use as fibers can include, but are not limited to, both natural and synthetic polymers. Polymers for fibers can include thermosets as well as thermoplastics with relatively high melt temperatures, such as 210 degrees Celsius or higher.

Natural fibers that can be used in the invention include fibers derived from jute, flax, hemp, ramie, cotton, kapok, coconut, palm leaf, sisal, and others.

Synthetic fibers that can be used in the manufacture of the composites herein include cellulose acetate, acrylic fibers such as acrylonitrile, methylmethacrylate fibers, methylacrylate fibers, and a variety of other basic acrylic materials including homopolymers and copolymers of a variety of acrylic monomers, aramid fibers which comprise polyamides having about 85% or more of amide linkages directly attached to two aromatic rings, nylon fibers, polyvinylidene dinitryl polymers. Polyester including polyethylene terephthlate, polybutylene terephthlate, polyethylene naphthalate, RAYON, polyvinylidene chloride, spandex materials such as known segmented polyurethane thermoplastic elastomers, vinyl alcohol, and modified polyvinyl alcohol polymers and others.

Fibers used herein can include newly synthesized or virgin materials as well as recycled materials or portions of recycled materials.

In some embodiments, the material of the fibers can be organic in nature. In other embodiments, the material of the fibers can be inorganic in nature. Fibers can be carbon fibers, basalt fibers, cellulosic fibers, ligno-cellulosic fibers, silicate fibers, boron fibers, and the like. Exemplary metal fibers that can be used herein can include steel, stainless steel, aluminum, titanium, copper and others.

Fibers used herein can have various tensile strengths. Tensile strength can be measured in various ways, such as in accordance with ASTM D2101. In some embodiments, the tensile strength of fibers used herein can be greater than or equal to about 1000, 1500, 2000, 2500, or 3000 MPa. In some embodiments, the tensile strength of fibers herein can be less than about 5000 MPa.

Fibers herein can include those having various dimensions. Fibers used herein can have an average diameter greater than or equal to about 1, 2, 3, 4, 5, 10, 15, 20, 25, 30, 35, 40, 45, 50, 100, 200, 300, or 500 microns. In some embodiments, fibers used herein can have an average diameter of less than or equal to about 1000, 900, 800, 700, 600, 500, 400, 300, 200, 100, or 50 microns. In various embodiments, the average diameter of fibers used herein can be in a range wherein any of the foregoing diameters can serve as the upper or lower bound of the range, provided that the upper bound is greater than the lower bound. In some embodiments, the average diameter of the fibers used herein can be from 2 microns to 50 microns. In some embodiments, the average diameter of the fibers used herein can be from 10 microns to 20 microns.

Fibers used herein can have an average length of greater than or equal to about 0.1, 0.2, 0.4, 0.6, 0.8, 1, 2, 3, 4, 6, 8, 10, 12, 14, 16, 18, 20, 30, 40, 50, or 100 millimeters in length. In some embodiments, fibers used herein can have an average length of less than or equal to about 150, 100, 90, 80, 70, 60, 50, 40, 30 20, 10, 8, 5, 4, 3, or 2 millimeters. In various embodiments, the average length of fibers used herein can be in a range where any of the foregoing lengths can serve as the upper or lower bound of the range, provided that the upper bound is greater than the lower bound. In some embodiments, the average lengths of the fibers used herein can be from 0.2 millimeters to 10 millimeters. In some embodiments, the average lengths of the fibers used herein can be from 2 millimeters to 8 millimeters. It will be appreciated that fiber breakage typically occurs because of shear forces within the extruder. Therefore, the foregoing lengths can be as measured prior to compounding and/or extruding steps or after compounding and/or extruding steps such as in the finished extrudate.

Fibers herein can also be characterized by their aspect ratio, wherein the aspect ratio is the ratio of the length to the diameter. In some embodiments, fibers herein can include those having an aspect ratio of about 10,000:1 to about 1:1. In some embodiments, fibers herein can include those having an aspect ratio of about 5,000:1 to about 1:1. In some embodiments, fibers herein can include those having an aspect ratio of about 600:1 to about 2:1. In some embodiments, fibers herein can include those having an aspect ratio of about 500:1 to about 4:1. In some embodiments, fibers herein can include those having an aspect ratio of about 400:1 to about 15:1. In some embodiments, fibers herein can include those having an aspect ratio of about 350:1 to about 25:1. In some embodiments, fibers herein can include those having an aspect ratio of about 300:1 to about 50:1.

It will be appreciated that in many embodiments not every fiber used will be identical in its dimensions and, as such, the foregoing dimensions can refer to the average (mean) of the fibers that are used.

It will be appreciated that the dimensions of fibers can change during processing steps associated with the creation of extruded articles including, but not limited to, steps of compounding and/or extruding. As such, in some embodiments the foregoing measures of aspect ratio, length, and diameter can be as measured before such processing steps or as measured after such processing steps.

In some embodiments, the fibers used herein can include a single fiber type in terms of material and dimensions and in other embodiments can include a mixture of different fiber types and/or fiber dimensions. In some embodiments, the fibers used herein can include a first fiber type and/or size in combination with a second fiber type and/or size.

In various embodiments, fibers used herein can be coated with a material. By way of example, fibers can be coated with a lubricant, a tie layer, or other type of compound.

The amount of the fibers used in the composition can vary based on the application. In some embodiments, the amount of fibers in the extruded composition can be greater than or equal to about 2, 4, 6, 8, 10, 15, 20, 25, 30, 40, 50, 60, 70, or even 80 wt. % (calculated based on the weight of the fibers as a percent of the total weight of the extruded composition in which the fibers are disposed). In some embodiments, the amount of fibers in extruded composition can be less than or equal to about 90, 80, 75, 70, 65, 60, 55, 50, 45, 40, 35, 30, 25, 20, or 15 weight percent. In some embodiments, the amount of fibers in the extruded composition can be in a range wherein each of the foregoing numbers can serve as the upper or lower bounds of the range provided that the upper bound is larger than the lower bound.

In various embodiments, the particles can be substantially uniformly dispersed within a given extruded composition.

As used herein, the term "resin" shall refer to the thermoplastic polymer content of the extruded or pultruded composition. The resin portion of the composition excludes any polymer content provided by processing aids.

Polymer resins used with embodiments herein (including "first compositions" and/or "second compositions" herein) can include various types of polymers including, but not limited to, addition polymers, condensation polymers, natural polymers, treated polymers, and thermoplastic resins.

Thermoplastic resins herein can include addition polymers including poly alpha-olefins, polyethylene, polypropylene, poly 4-methyl-pentene-1, ethylene/vinyl copolymers, ethylene vinyl acetate copolymers, ethylene acrylic acid copolymers, ethylene methacrylate copolymers, ethylmethylacrylate copolymers, etc.; thermoplastic propylene polymers such as polypropylene, ethylene-propylene copolymers, etc.; vinyl chloride polymers and copolymers; vinylidene chloride polymers and copolymers; polyvinyl alcohols, acrylic polymers made from acrylic acid, methacrylic acid, methylacrylate, methacrylate, acrylamide and others. Fluorocarbon resins such as polytetrafluoroethylene, polyvinylidiene fluoride, and fluorinated ethylene-propylene resins. Styrene resins such as a polystyrene, alpha-methylstyrene, high impact polystyrene acrylonitrile-butadiene-styrene polymers.

A variety of condensation polymers can also be used in the manufacture of the composites herein including nylon (polyamide) resins such as nylon 6, nylon 66, nylon 10, nylon 11, nylon 12, etc. A variety of polyester materials can be made from dibasic aliphatic and aromatic carboxylic acids and di- or triols. Representative examples include polyethylene-terephthlate, polybutylene terephthlate and others.

Polycarbonates can also be used in the polymeric resin. Such polycarbonates are long chained linear polyesters of carbonic acid and dihydric phenols typically made by reacting phosgene ($COCl_2$) with bisphenol A resulting in transparent, tough, dimensionally stable plastics. A variety of other condensation polymers are used including polyetherimide, polysulfone, polyethersulfone, polybenzazoles, aromatic polysulfones, polyphenylene oxides, polyether ether ketone, and others.

Poly(vinyl chloride) can be used as a homopolymer, but can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile; alpha-olefins such as ethylene, propylene, etc.; chlorinated monomers such as vinylidene chloride, chlorinated polyethylene, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

In some embodiments, poly(vinyl chloride) polymers having an average molecular weight (Mn) of about 40,000 to about 140,000 (90,000+/−50,000) can be used. In some embodiments, poly(vinyl chloride) polymers having an average molecular weight (Mn) of about 78,000 to about 98,000 (88,000+/−10,000) can be used.

In some embodiments, poly(vinyl chloride) polymers used herein can have an inherent viscosity (IV—ASTM D-5225) of about 0.68 to about 1.09. In some embodiments, poly(vinyl chloride) polymers used herein can have an inherent viscosity of about 0.88 to about 0.92.

In some embodiments, poly(vinyl chloride) polymers used herein can have a glass transition temperature (Tg) of about 70 to about 80 degrees.

Poly(vinyl chloride) polymers are available from many sources under various tradenames including, but not limited to, Oxy Vinyl, Vista 5385 Resin, Shintech SE-950EG and Oxy Vinyl 225G, among others.

In some embodiments, polypropylene having a melt flow rate (g/10 min) (ASTM D1238, 230 C) of 0.5 to 75.0 can be used. In some embodiments, polypropylene having a glass transition temperature (Tg) of about 0 to about 20 degrees Celsius can be used.

In some embodiments, polyethylene terephthalate (PET) having an intrinsic viscosity (IV) (Dl/g) of about 0.76 to about 0.9 can be used. In some embodiments, polyethylene terephthalate (PET) having a glass transition temperature (Tg) of about 70 to about 80 degrees Celsius can be used. In some embodiments, glycol modified polyethylene terephthalate (PETG) having a glass transition temperature (Tg) of about 78-82 degrees Celsius can be used.

In some embodiments, polybutylene terephthalate (PBT) having a melt flow rate (g/10 min) (ASTM D1238, 1.2 kg, 250 C) of 100 to 130 can be used. In some embodiments, polybutylene terephthalate (PBT) having a glass transition temperature (Tg) of about 45 to about 85 degrees Celsius can be used.

Polymer blends or polymer alloys can be used herein. Such alloys can include two miscible polymers blended to form a uniform composition. A polymer alloy at equilibrium comprises a mixture of two amorphous polymers existing as a single phase of intimately mixed segments of the two macro molecular components. Miscible amorphous polymers can form glasses upon sufficient cooling and a homogeneous or miscible polymer blend can exhibit a single, composition dependent glass transition temperature (Tg). An immiscible or non-alloyed blend of polymers typically displays two or more glass transition temperatures associated with immiscible polymer phases.

Polymeric resin materials herein can retain sufficient thermoplastic properties to permit melt blending with fiber, to permit formation of extruded articles or other extrudates such as pellets, and to permit the composition material or pellet to be extruded in a thermoplastic process or in conjunction with a pultrusion process.

In some embodiments, polymer resins herein can include extrusion grade polymer resins. In some embodiments, polymer resins herein can include resins other than extrusion grade polymer resins, including, but not limited to, injection molding grade resins. Polymer resins used herein can include non-degradable polymers. Non-degradable polymers can include those that lack hydrolytically labile bonds (such as esters, orthoesters, anhydrides and amides) within the polymeric backbone. Non-degradable polymers can also include those for which degradation is not mediated at least partially by a biological system. In some embodiments, polymers that are otherwise degradable can be made to be non-degradable through the use of stabilizing agents that prevent substantial break down of the polymeric backbone.

Polymer resins herein can include those derived from renewable resources as well as those derived from non-renewable resources. Polymers derived from petroleum are generally considered to be derived from non-renewable resources. However, polymers that can be derived from biomass are generally considered to be derived from renewable resources. Polymer resins can specifically include polyesters (or biopolyesters) derived from renewable resources, including, but not limited to polyhydroxybutyrate, polylactic acid (PLA or polylactide), and the like. Such polymers can be used as homopolymer and/or copolymers including the same as subunits. Polymer resins herein can specifically include extrusion grade polymers.

PLA can be amorphous or crystalline. In certain embodiments, the PLA is a substantially homopolymeric polylactic acid. Such a substantially homopolymeric PLA promotes crystallization. Since lactic acid is a chiral compound, PLA can exist either as PLA-L or PLA-D. As used herein, the term homopolymeric PLA refers to either PLA-L or PLA-D, wherein the monomeric units making up each polymer are all of substantially the same chirality, either L or D. Typically, polymerization of a racemic mixture of L- and D-lactides usually leads to the synthesis of poly-DL-lactide (PDLLA), which is amorphous. In some instances, PLA-L and PLA-D will, when combined, co-crystallize to form stereoisomers, provided that the PLA-L and PLA-D are each substantially homopolymeric, and that, as used herein, PLA containing such stereoisomers is also to be considered homopolymeric. Use of stereospecific catalysts can lead to heterotactic PLA, which has been found to show crystallinity. The degree of crystallinity can be influenced by the ratio of D to L enantiomers used (in particular, greater amount of L relative to D in a PLA material is desired), and to a lesser extent on the type of catalyst used. There are commercially available PLA resins that include, for example, 1-10% D and 90-99% L. Further information about PLA can be found in the book *Poly(Lactic Acid) Synthesis, Structures, Properties, Processing, and Applications*, Wiley Series on Polymer Engineering and Technology (Rafael Auras et al. eds., 2010).

In some embodiments, polylactic acid polymers having number average molecular weights of about 50,000 to 111,000, or weight average molecular weights (Mw) ranging from 100,000 to 210,000, and polydispersity indices (PDI) of 1.9-2 can be used.

In some embodiments, polylactic acid polymers having a melt flow rate (g/10 min) (ASTM D1238, 210 C 2.16 kg) of about 5.0 to about 85 can be used. In some embodiments, polylactic acid polymers having a glass transition temperature (Tg) of about 45 to about 65 degrees Celsius can be used. In some embodiments, polylactic acid polymers having a glass transition temperature (Tg) of about 55 to about 75 degrees Celsius can be used.

Polymers of the polymer resin used herein can have various glass transition temperatures, but in some embodiments glass transition temperatures of at least 120, 130, 140, 150, 160, 170, 180, 190, 200, 220, 240, 260, 280, 300, 320, 340, 360, 380 or 400 degrees Fahrenheit. In some embodiments, polymers having a glass transition temperature of from about 140° F. to about 220° F. can be used.

The polymer resin can make up the largest share of the extruded composition. In some embodiments, the polymer resin is at least about 20, 25, 30, 35, 40, 45, 50, 55, 60, 65, 70, 75, 80, 85, 90, 95, 98, or 99 wt. % of the extruded composition. In some embodiments, the amount of the polymer resin in the composition can be in a range wherein any of the foregoing numbers can serve as the upper or lower bound of the range, provided that the upper bound is larger than the lower bound.

Composite compositions herein (including but not limited to compositions referred to as "second compositions herein") can also include impact modifiers. Impact modifiers can include acrylic impact modifiers. Acrylic impact modifiers can include traditional type acrylic modifiers as well as core-shell type impact modifiers. Exemplary acrylic impact modifiers can include those sold under the tradename DURASTRENGTH, commercially available from Arkema, and PARALOID (including, specifically, KM-X100) commercially available from Dow Chemical.

Impact modifiers can also include various copolymers including, but not limited to, ethylene-vinyl acetate (EVA), acrylonitrile-butadiene-styrene (ABS), methacrylate butadiene styrene (MBS), chlorinated polyethylene (CPE), ethylene-vinyl acetate-carbon monoxide, or ethylene-n-butyl acrylate-carbon monoxide. Exemplary impact modifier copolymers can include those sold under the tradename ELVALOY, commercially available from DuPont.

The amount of impact modifier used can vary in different embodiments. One approach to quantifying the amount of impact modifier used can be with reference to the amount of polymer resin used. As is common in the extrusion art, this type of quantification can be stated as the parts by weight of the component in question per hundred parts by weight of the polymer resin. This can be referred to as "parts per hundred resin" or "phr".

In some embodiments, the composition can include an amount of impact modifier of greater than or equal to 0.1 phr, 0.5 phr, 1 phr, 2 phr, 3 phr, 4 phr, 5 phr, 6 phr, 7 phr, 8 phr, 10 phr, 12.5 phr, 15 phr, or 20 phr. In some embodiments, the composition can include an amount of impact modifier of less than or equal to 40 phr, 35 phr, 30 phr, 27.5 phr, 25 phr, 22.5 phr, 20 phr, 17.5 phr, or 15 phr. In some embodiments, the composition can include an amount of impact modifier in a range wherein any of the foregoing numbers can serve as the lower or upper bounds of the range provided that the lower bound is less than the upper bound.

By way of example, in some embodiments, the composition can include an amount of impact modifier of greater than or equal to 0.1 phr and less than or equal to 40 phr. In some embodiments, the composition can include an amount of impact modifier of greater than or equal to 1.0 phr and less than or equal to 30 phr. In some embodiments, the composition can include an amount of impact modifier of greater than or equal to 1.0 phr and less than or equal to 30 phr. In some embodiments, the composition can include an amount of impact modifier of greater than or equal to 2.0 phr and less than or equal to 25 phr. In some embodiments, the composition can include an amount of impact modifier of greater than or equal to 3.0 phr and less than or equal to 25 phr. In some embodiments, the composition can include an amount of impact modifier of greater than or equal to 4.0 phr and less than or equal to 25 phr.

In some embodiments, the composition can include an amount of impact modifier of greater than or equal to 5 phr and less than or equal to 25 phr. In some embodiments, the composition can include an amount of impact modifier of greater than or equal to 6 phr and less than or equal to 20 phr. In some embodiments, the composition can include an amount of impact modifier of greater than or equal to 7 phr and less than or equal to 20 phr. In some embodiments, the composition can include an amount of impact modifier of greater than or equal to 5 phr and less than or equal to 20 phr. In some embodiments, the composition can include an amount of impact modifier of greater than or equal to 10 phr and less than or equal to 20 phr.

It will be appreciated that various other components can be extruded with compositions herein (first or second compositions) and in some cases can form part of compositions herein. By way of example, process aids can be included in various embodiments.

Examples of process aids include acrylic processing aids, waxes, such as paraffin wax, stearates, such as calcium stearate and glycerol monostearate, and polymeric materials, such as oxidized polyethylene. Various types of stabilizers can also be included herein such as UV stabilizers, lead, tin and mixed metal stabilizers, and the like. It is contemplated that there may be examples wherein satisfactory results may be obtained without one or more of the disclosed additives. Exemplary processing aids can include a process aid that acts as a metal release agent and possible stabilizer available under the trade designation XL-623 (paraffin, montan and fatty acid ester wax mixture) from Amerilubes, LLC of Charlotte, N.C. Calcium stearate is another suitable processing aid that can be used as a lubricant. Typical amounts for such processing aids can range from 0 to 20 wt. % based on the total weight of the composition, depending on the melt characteristics of the formulation that is desired. In some embodiments, the amount of processing aids is from 2 to 14 wt. %. In some embodiments, the amount of processing aids (as measured in parts per hundred resin) can range from 0 to 40 phr, 0.5 to 30 phr, or 0.5 to 20 phr.

Examples of other components that can be included are calcium carbonate, titanium dioxide, pigments, and the like.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. An impact-resistant fenestration unit comprising:

a frame assembly comprising a sill, a head jamb, and two opposed side jambs, the frame assembly forming a first lower corner and a second lower corner;

a first sill corner bracket configured to fit on a top of the sill and extend from the first lower corner partway along the top of the sill and partway along one side jamb of the frame assembly;

a second sill corner bracket configured to fit on the top of the sill and extend from the second lower corner partway along the top of the sill and partway along the other side jamb; and a movable bottom sash, the movable bottom sash configured to move within the frame between a closed position where a bottom portion of the bottom sash engages the top of the sill and an open position where the bottom portion of the bottom sash is separated from the top of the sill;

the bottom sash comprising a bottom rail, wherein the bottom rail defines a channel to receive at least a portion of the first corner bracket and the second corner bracket therein when the bottom sash is in the closed position.

2. The impact-resistant fenestration unit of claim 1, wherein the first and second sill corner brackets are anchored in place using a fastener that penetrates through the frame assembly into an area outside the frame assembly.

3. The impact-resistant fenestration unit of claim 1, the sill, a head jamb, and two opposed side jambs formed from a lineal extrusion comprising a thermoplastic resin.

4. The impact-resistant fenestration unit of claim 1, the movable bottom sash comprising a glass subassembly and a retention member, the glass subassembly comprising an interior laminate pane and an exterior pane, the retention member engaging at least a portion of the interior laminate pane.

5. The impact-resistant fenestration unit of claim 1, wherein the sill comprises a first support block and a second support block, wherein the first support block and the second support block are configured to fit within the channel when the bottom sash is in the closed position.

6. The impact-resistant fenestration unit of claim 1, wherein the first sill corner bracket comprises a horizontal support arm and a vertical support arm, and the second sill corner bracket comprises a horizontal support arm and a vertical support arm.

7. The impact-resistant fenestration unit of claim 6, wherein the first sill corner bracket horizontal support arm is substantially perpendicular to the first sill corner bracket vertical support arm, and the second sill corner bracket horizontal support arm is substantially perpendicular to the second sill corner bracket vertical support arm.

8. The impact-resistant fenestration unit of claim 6, wherein the first sill corner bracket horizontal support arm is configured to fit on top of the sill and the second sill corner bracket horizontal support arm is configured to fit on top of the sill, and wherein the first sill corner bracket horizontal support arm extends towards the second sill corner bracket horizontal support arm, and the second sill corner bracket horizontal support arm extends towards the first sill corner bracket horizontal support arm.

9. The impact-resistant fenestration unit of claim 8, wherein the first sill corner bracket vertical support arm is configured to extend along one side jamb and the second sill corner bracket vertical support arm is configured to extend along the other side jamb, wherein the first sill corner bracket vertical support arm is inset within the one side jamb and the second sill corner bracket vertical support arm is inset within the other side jamb, and wherein the vertical support arms are inset within the jambs.

10. The impact-resistant fenestration unit of claim 6, wherein the first sill corner bracket horizontal support arm defines an aperture, and the first sill corner bracket vertical support arm defines an aperture, and wherein the second sill corner bracket horizontal support arm defines an aperture, and the second sill corner bracket vertical support arm defines an aperture, and wherein each of the apertures are configured to receive a fastener.

11. The impact-resistant fenestration unit of claim 1, wherein the horizontal support arms of the first and second sill corner brackets each define a top surface in a first plane and a bottom surface in a second plane, wherein the first and second planes are not parallel.

12. The impact-resistant fenestration unit of claim 1, wherein the first sill corner bracket and the second sill corner bracket are configured to be disposed within the channel defined by the bottom rail such that the first sill corner bracket and the second sill corner brackets are not visible.

13. The impact-resistant fenestration unit of claim 1, the bottom sash further comprising a check rail and two opposed stiles, the bottom rail, check rail, and two opposed stiles formed from a lineal extrusion comprising a thermoplastic resin.

14. The impact-resistant fenestration unit of claim 1, the bottom sash further comprising a check rail and two opposed stiles, wherein at least one of the bottom rail, check rail, and two opposed stiles includes a portion comprising a composite including a thermoplastic resin and at least one of particles and glass fibers.

15. The impact-resistant fenestration unit of claim 1, the bottom sash further comprising a check rail and two opposed stiles, wherein the first stile of the two opposed stiles and the bottom rail intersect appearing as a mortise and tenon joint, the first stile of the two opposed stiles and the check rail intersect appearing as a mortise and tenon joint, the second stile of the two opposed stiles and the bottom rail intersect appearing as a mortise and tenon joint, and the second stile of the two opposed stiles and the check rail intersect appearing as a mortise and tenon joint.

16. The impact-resistant fenestration unit of claim 1, the bottom sash further comprising a check rail and two opposed stiles, wherein at least one of the first stile, the second stile, the bottom rail, and the check rail comprises a thermal break between interior and exterior sides thereof.

17. The impact-resistant fenestration unit of claim 1, wherein the bottom rail lacks a metal material interconnecting an exterior window side of the first stile with an interior window side of the first stile.

18. The impact-resistant fenestration unit of claim 1, wherein metal makes up less than 30 percent by weight of the impact-resistant fenestration unit excluding hardware and fasteners.

19. An impact-resistant fenestration unit comprising:

a frame assembly comprising a sill, a head jamb, and two opposed side jambs, the frame assembly forming a first lower corner and a second lower corner;

a first sill corner bracket configured to fit on top of the sill and extend from the first lower corner partway along the top of the sill;

a second sill corner bracket configured to fit on top of the sill and extend from the second lower corner partway along the top of the sill;

a bottom sash, the bottom sash comprising a bottom rail, a check rail, and two opposed stiles, the bottom sash configured to move within the frame between a closed position where a bottom portion of the bottom sash engages a top of the sill and an open position where the bottom portion of the bottom sash is separated from the top of the sill; the bottom sash forming a first lower corner, a second lower corner, a first upper corner, and a second upper corner;

the check rail of the bottom sash comprising a surface defining an exterior window side top corner and an interior window side top corner, wherein a radius of curvature of the interior corner is greater than 0.2 inches;

wherein the impact-resistant fenestration unit exhibits impact resistance properties satisfying ASTM E1996-17 missile level D; and wherein the impact-resistant fenestration unit exhibits a U factor of less than or equal to 0.40 BTU/h*ft2*° F.

20. An impact-resistant fenestration unit comprising:

a frame assembly comprising a sill, a head jamb, and two opposed side jambs, the frame assembly forming a first lower corner and a second lower corner;

a first sill corner bracket configured to fit on top of the sill and extend from the first lower corner partway along the top of the sill;

a second sill corner bracket configured to fit on top of the sill and extend from the second lower corner partway along the top of the sill;

a top sash;

a bottom sash, the bottom sash comprising a bottom rail, a check rail, and two opposed stiles, the bottom sash configured to move within the frame between a closed position where a bottom portion of the bottom sash engages a top of the sill and an open position where the bottom portion of the bottom sash is separated from the top of the sill; the bottom sash forming a first lower corner, a second lower corner, a first upper corner, and a second upper corner;

the bottom sash comprising a transparent central area and the top sash comprising a transparent central area, wherein the transparent areas cover a surface area of at least 55% of the overall area defined by an outer perimeter of the frame assembly;

wherein the impact-resistant fenestration unit exhibits impact resistance properties satisfying ASTM E1996-17 missile level D; and wherein the impact-resistant fenestration unit exhibits a U factor of less than or equal to 0.40 BTU/h*ft2*° F.

* * * * *